(12) United States Patent
Kasperchik et al.

(10) Patent No.: US 12,042,860 B2
(45) Date of Patent: Jul. 23, 2024

(54) BUILD MATERIAL COMPOSITION

(71) Applicant: HEWLETT-PACKARD DEVELOPMENT COMPANY, L.P., Spring, TX (US)

(72) Inventors: Vladek Kasperchik, Corvallis, OR (US); Mohammed S. Shaarawi, Corvallis, OR (US); James McKinnell, Corvallis, OR (US); Tienteh Chen, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/199,945

(22) Filed: May 20, 2023

(65) Prior Publication Data

US 2023/0294172 A1 Sep. 21, 2023

Related U.S. Application Data

(60) Division of application No. 16/604,802, filed as application No. PCT/US2018/029630 on Apr. 26, (Continued)

(51) Int. Cl.
*B22F 1/10* (2022.01)
*B22F 1/05* (2022.01)
(Continued)

(52) U.S. Cl.
CPC ............... *B22F 1/10* (2022.01); *B22F 1/05* (2022.01); *B22F 1/102* (2022.01); *B22F 1/16* (2022.01);
(Continued)

(58) Field of Classification Search
CPC .... B22F 1/10; B22F 1/102; B22F 1/05; B22F 1/16; B22F 1/73; B22F 2304/10;
(Continued)

(56) References Cited

U.S. PATENT DOCUMENTS 4,740,352 A 4/1988 Takahashi
5,782,954 A 7/1998 Luk
(Continued)

FOREIGN PATENT DOCUMENTS

CN 102862295 A 1/2013
CN 104997643 A 10/2015
(Continued)

OTHER PUBLICATIONS

Wikipedia, "Hausner ratio", XP93078417, Retrieved from the Internet Sep. 4, 2023: URL: https://en.wikipedia.org/wiki/Hausner_ratio, 1 page.
(Continued)

*Primary Examiner* — Ruiyun Zhang
(74) *Attorney, Agent, or Firm* — Dierker & Kavanaugh, P.C.

(57) ABSTRACT

An example of a method for making a build material composition for three-dimensional (3D) printing includes freezing a dispersion of flow additive nanoparticles in a liquid to form a frozen liquid containing the flow additive nanoparticles. The frozen liquid containing the flow additive nanoparticles is lyophilized to form flow additive agglomerates having a porous, fractal structure. The flow additive agglomerates are mixed with a host metal. The flow additive nanoparticles have an average flow additive particle size ranging from about 1 to about 3 orders of magnitude smaller than an average host metal particle size of the host metal.

15 Claims, 10 Drawing Sheets

Related U.S. Application Data 2018, now Pat. No. 11,684,978, which is a continuation-in-part of application No. PCT/US2018/028341, filed on Apr. 19, 2018, which is a continuation-in-part of application No. PCT/US2018/027286, filed on Apr. 12, 2018, which is a continuation-in-part of application No. PCT/US2018/022684, filed on Mar. 15, 2018.

(51) Int. Cl.

| | | |
|---|---|---|
| B22F 1/102 | (2022.01) | |
| B22F 1/16 | (2022.01) | |
| B22F 10/10 | (2021.01) | |
| B22F 10/14 | (2021.01) | |
| B22F 10/73 | (2021.01) | |
| B29C 64/165 | (2017.01) | |
| B33Y 10/00 | (2015.01) | |
| B33Y 40/10 | (2020.01) | |
| B33Y 70/10 | (2020.01) | |
| C08F 2/22 | (2006.01) | |
| C08F 212/08 | (2006.01) | |
| C08F 220/14 | (2006.01) | |
| C08K 3/11 | (2018.01) | |
| C09D 11/037 | (2014.01) | |
| C09D 11/322 | (2014.01) | |
| C09D 11/38 | (2014.01) | |
| B22F 10/28 | (2021.01) | |
| B82Y 30/00 | (2011.01) | |

(52) U.S. Cl.
CPC ............. *B22F 10/10* (2021.01); *B22F 10/14* (2021.01); *B22F 10/73* (2021.01); *B29C 64/165* (2017.08); *B33Y 10/00* (2014.12); *B33Y 40/10* (2020.01); *B33Y 70/10* (2020.01); *C08F 2/22* (2013.01); *C08F 212/08* (2013.01); *C08F 220/14* (2013.01); *C08K 3/11* (2018.01); *C09D 11/037* (2013.01); *C09D 11/322* (2013.01); *C09D 11/38* (2013.01); *B22F 10/28* (2021.01); *B22F 2304/10* (2013.01); *B22F 2998/10* (2013.01); *B82Y 30/00* (2013.01)

(58) Field of Classification Search
CPC ..... B22F 2998/10; B33Y 10/00; B33Y 40/10; B33Y 70/10; B33Y 70/00
USPC .................................. 524/431; 148/513, 514
See application file for complete search history.

(56) References Cited

U.S. PATENT DOCUMENTS

| | | |
|---|---|---|
| 7,073,349 B2 | 7/2006 | Shekunov et al. |
| 7,258,720 B2 | 8/2007 | Fuwa et al. |
| 8,760,719 B2 | 6/2014 | Tyagi et al. |
| 8,992,659 B2 | 3/2015 | Larsson et al. |
| 9,176,405 B2 | 11/2015 | Nair et al. |
| 9,278,338 B2 | 3/2016 | Coupland |
| 9,421,612 B2 | 8/2016 | Fang et al. |
| 9,428,610 B2 | 8/2016 | Diekmann et al. |
| 2002/0178866 A1 | 12/2002 | Kawasaki |
| 2004/0009340 A1 | 1/2004 | Zhu et al. |
| 2004/0182202 A1 | 9/2004 | Geving et al. |
| 2005/0003189 A1 | 1/2005 | Bredt et al. |
| 2006/0051513 A1 | 3/2006 | Jackson et al. |
| 2006/0165910 A1 | 7/2006 | Kodas et al. |
| 2006/0229197 A1 | 10/2006 | Stark et al. |
| 2006/0251535 A1 | 11/2006 | Pfeifer et al. |
| 2007/0178163 A1 | 8/2007 | Kodas et al. |
| 2009/0136737 A1 | 5/2009 | Ring et al. |
| 2013/0143043 A1 | 6/2013 | Iwanaga et al. |
| 2014/0037338 A1 | 2/2014 | Tyagi et al. |
| 2015/0035209 A1 | 2/2015 | Shah et al. |
| 2015/0316868 A1 | 11/2015 | Ganapathiappan et al. |
| 2016/0002471 A1 | 1/2016 | Peng et al. |
| 2016/0200891 A1 | 7/2016 | Virgilio et al. |
| 2016/0333190 A1 | 11/2016 | Brule et al. |
| 2017/0189960 A1 | 7/2017 | Ibe |
| 2017/0326641 A1 | 11/2017 | Lee et al. |
| 2018/0044484 A1 | 2/2018 | Kalyanaraman |
| 2018/0194662 A1 | 7/2018 | Kim et al. |
| 2018/0369908 A1 | 12/2018 | Muto et al. |
| 2019/0016042 A1 | 1/2019 | Chisholm |
| 2019/0062914 A1 | 2/2019 | King et al. |

FOREIGN PATENT DOCUMENTS

| | | |
|---|---|---|
| EP | 1252952 A2 | 10/2002 |
| EP | 1094909 B1 | 12/2004 |
| EP | 2221130 A1 | 8/2010 |
| EP | 2446985 A1 | 5/2012 |
| EP | 3187285 A1 | 7/2017 |
| EP | 3260258 A1 | 12/2017 |
| JP | 5905205 B2 | 4/2016 |
| JP | 2017-127998 A | 7/2017 |
| RU | 2000884 C1 | 10/1993 |
| RU | 2333076 C1 | 9/2008 |
| RU | 2489231 C1 | 8/2013 |
| WO | 99/59753 A1 | 11/1999 |
| WO | 02/11929 A1 | 2/2002 |
| WO | 2016/031279 A1 | 3/2016 |
| WO | 2016/065218 A1 | 4/2016 |
| WO | 2016/068899 A1 | 5/2016 |
| WO | 2016/119558 A1 | 8/2016 |
| WO | 2016/181378 A2 | 11/2016 |
| WO | 2017/018985 A1 | 2/2017 |
| WO | 2017/040893 A1 | 3/2017 |
| WO | 2017/040897 A1 | 3/2017 |
| WO | 2017/059866 A2 | 4/2017 |
| WO | 2017/077220 A1 | 5/2017 |
| WO | 2017/081160 A1 | 5/2017 |
| WO | 2017/096748 A1 | 6/2017 |
| WO | 2017/099250 A1 | 6/2017 |
| WO | 2017/109497 A1 | 6/2017 |
| WO | 2017/109703 A1 | 6/2017 |
| WO | 2017/112687 A1 | 6/2017 |
| WO | 2017/112689 A1 | 6/2017 |
| WO | 2017/180314 A1 | 10/2017 |
| WO | 2018/017130 A1 | 1/2018 |
| WO | 2018/026962 A1 | 2/2018 |
| WO | 2018/031828 A1 | 2/2018 |
| WO | 2018/119409 A1 | 6/2018 |

OTHER PUBLICATIONS

Anonymous: (A) Scanning electron microscopy (SEM) image of iron oxide . . . Download Scientific Diagram, online available at <https://www.researchgate.net/figure/A-Scanning-electron-microscopy-SEM-image-of-iron-oxide-nanoparticles-B-Field_fig2_337775798> Feb. 5, 2013, pp. 1-13, XP055889835.

Bai et al., "Effect of Bimodal Powder Mixture on Powder Packing Density and Sintered Density in Binder Jetting of Metals", p. 758-771, p. 764, table 2, Hallottexo B I4HTepHeT—http://sffsymposium.engr.utexas.edu/sites/default/files/2015/2015-62-Bai.pdf.

Berretta, S., et al., Size, Shape and Flow of Powders for Use in Selective Laser Sintering, 2013, University of Exeter, pp. 1-6.

Kumfer, B. M., et al., "Gas-phase flame synthesis and properties of magnetic iron oxide nanoparticles with reduced oxidation state," Journal of Aerosol Science, Sevier, Amsterdam, NL, vol. 41, No. 3, 2010, pp. 257-265.

Modasiya, M.K., et al. "Design and Characterization of Fast Disintegrating Tablets of Piroxicam", InU. PharmTech (2009), vol. 1, No. 2, pp. 354-357.

Shikata, F., et al., "Real-time monitoring of granule properties during high shear wet granulation by near-infrared spectroscopy with chemometrics approach," 2017, Royal Society of Chemistry, vol. 7, pp. 38307-38317.

(56) References Cited

OTHER PUBLICATIONS

Venables, H. et al. "Powder mixing", Drug Development and Industrial Pharmacy, vol. 27, No. 7, 2001, pp. 599-612.
Williams et al., Manufacturing Cellular Materials via Three-Dimensional Printing of Spray-Dried Metal Oxide Ceramic Powder, Georgia Institute of Technology, Atlanta, GA 10 pages.
Yeap, S. P. "Permanent agglomerates in powdered nanoparticles: formation and future prospects." 2018. Powder technology. 323. p. 51-59. (Year: 2018).

400

410 — APPLYING A BUILD MATERIAL COMPOSITION INCLUDING:
  A HOST METAL PRESENT IN AN AMOUNT OF AT LEAST ABOUT 90 wt% BASED ON A TOTAL WEIGHT OF THE BUILD MATERIAL COMPOSITION; AND
  A FLOW ADDITIVE PRESENT IN AN AMOUNT OF LESS THAN ABOUT 10 wt% BASED ON THE TOTAL WEIGHT OF THE BUILD MATERIAL COMPOSITION, THE FLOW ADDITIVE INCLUDING FLOW ADDITIVE PRIMARY PARTICLES THAT:
    HAVE AN AVERAGE FLOW ADDITIVE PRIMARY PARTICLE SIZE RANGING FROM ABOUT 1 TO ABOUT 3 ORDERS OF MAGNITUDE SMALLER THAN AN AVERAGE HOST METAL PARTICLE SIZE; AND
    ARE SELECTED FROM THE GROUP CONSISTING OF:
      A METAL CONTAINING COMPOUND THAT IS REDUCIBLE TO AT LEAST ONE ELEMENTAL METAL IN A REDUCING ENVIRONMENT AT A REDUCING TEMPERATURE LESS THAN OR EQUAL TO A SINTERING TEMPERATURE OF THE HOST METAL, WHEREIN THE AT LEAST ONE ELEMENTAL METAL IS CAPABLE OF BEING INCORPORATED INTO A BULK METAL PHASE OF THE HOST METAL IN A FINAL METAL OBJECT;
      AN ORGANIC MATERIAL THAT IS PYROLYZABLE AT A PYROLYSIS TEMPERATURE THAT IS LESS THAN A SINTERING TEMPERATURE OF THE HOST METAL; AND
      A CROSS-LINKED, ORGANIC MATERIAL THAT IS PYROLYZABLE AT A PYROLYSIS TEMPERATURE THAT IS LESS THAN A SINTERING TEMPERATURE OF THE HOST METAL;
  WHEREIN THE BUILD MATERIAL COMPOSITION IS SPREADABLE, HAVING A HAUSNER RATIO LESS THAN 1.25

412 — SELECTIVELY APPLYING A BINDER AGENT ON AT LEAST A PORTION OF THE BUILD MATERIAL COMPOSITION

FIG. 7

BUILD MATERIAL COMPOSITION

CROSS-REFERENCE TO RELATED APPLICATIONS

This application is a division of U.S. application Ser. No. 16/604,802, filed Oct. 11, 2019, which itself is a 371 National Stage Entry of International Application No. PCT/US2018/029630, filed Apr. 26, 2018, which itself is a continuation-in-part of: International Patent Application Number PCT/US2018/022684, filed Mar. 15, 2018; International Patent Application Number PCT/US2018/027286, filed Apr. 12, 2018; and International Patent Application Number PCT/US2018/028341, filed Apr. 19, 2018, the contents of each of which is incorporated by reference herein in its entirety.

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material, and the mechanism for material coalescence may depend upon the type of build material used. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 7 is a flow diagram depicting an example of a 3D printing method;

DETAILED DESCRIPTION

Figure 1:
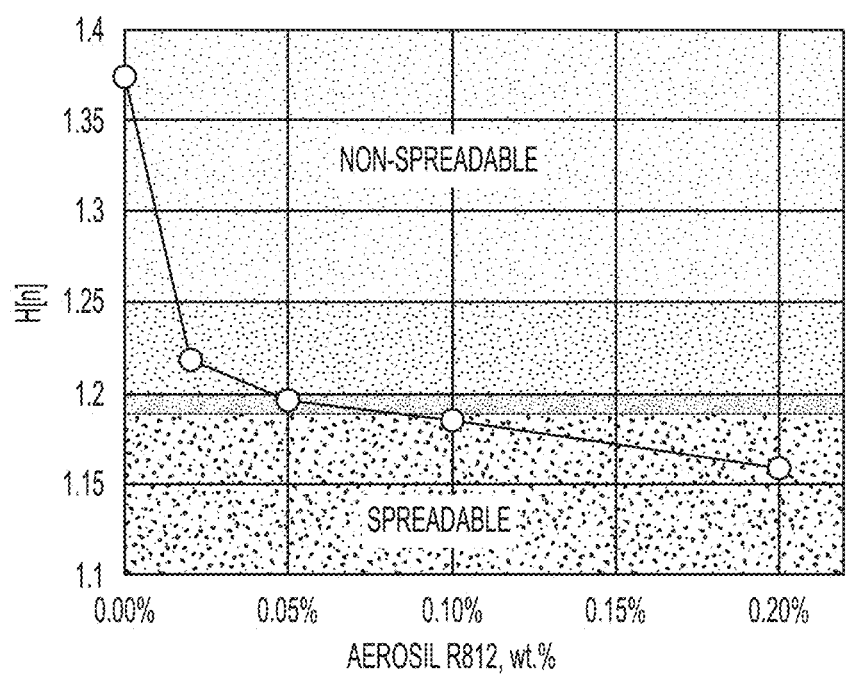
FIG. 1 depicts a graph of Hausner Ratio as a function of flow air weight percentage for a mixture of a comparative fumed silica flow aid in 316L stainless steel powder.

Disclosed herein is a method for making a build material composition, which includes a custom flow additive. The custom flow additive is formed by freezing and lyophilizing a nanoparticle-containing dispersion. The freezing portion of the process helps to maintain the structure of each nanoparticle in the dispersion. The lyophilization portion of the process forms low density agglomerates (of the nanoparticles) having porous, fractal structures that are easily broken, and prevents the formation of compacted agglomerates that are hard to break. When combined with the host build materials, the low density agglomerates readily break apart into individual flow additive nanoparticles and/or agglomerate fragments that stick to surfaces of the host build material. This improves the flowability and spreadability of the host build material.

It is believed that the nanoparticle in the nanoparticle-containing dispersion used to form the custom flow additive may have any composition that is suitable for the 3D printing process in which the build material composition is to be used. By "suitable for the 3D printing process," it is meant that the nanoparticle composition i) can be integrated into a 3D object being formed without deleteriously affecting the mechanical properties of the 3D object, or ii) can be removed during the heating stages of the 3D printing process, and thus not integrated into the 3D object. It is further believed that the custom flow additives disclosed herein may be used in applications other than 3D printing. In these examples, the composition may be selected to be suitable for the particular application (i.e., the flow additive does not deleteriously affect the host material or any aspect of application).

Some examples of the build material composition of the present disclosure may be used in a process to create a final metal object. For example, the process to create the final metal object may be a 3D printing process. In some examples, the 3D printing process may include subsequent patterning of uniformly spread layers of the composition with liquid binder applied by means of an inkjet printhead. Each patterned layer of the composition forms an individual cross-section of the final metal object. Stacking of the binder-patterned layers produces an intermediate part which can be extracted from the powderbed (or other build surface) after the patterning has been finished. The extracted intermediate part may be subjected to post-printing processing (e.g., heating via sintering), leading to consolidation of the particles of the composition into a mechanically stronger final metal object.

In other examples, the 3D printing process may include Selective Laser Melting (SLM). In these examples, uniformly spread layers of the build material composition are individually exposed to a laser beam of high energy density. The laser spot scans the spread metal powder surface, heats the metal particles, melts the metal particles and fuses the molten metal into continuous layers. During a SLM printing process, stacked fused layers (each layer representing a portion of the printed part) produce the final metal part (i.e., each subsequent laser-patterned layer is fused on top of the previous one). With SLM, the final metal part is produced without printing an intermediate part and without sintering the intermediate part. Therefore the sintering-related advantages of smaller particles size are not applicable to SLM; however, the flow additives disclosed herein enable non-classified, lower cost metal powders with wide particle size distribution to be used with SLM.

Examples of the build material composition disclosed herein may be used to in a 3D printing kit, a 3D printing system, and a 3D printing method. While some of the examples provided herein relate to 3D printing, it is to be understood that the flow additives disclosed herein and the compositions including the flow additives may also be used in other methods and applications.

As used herein, "material set" or "kit" is understood to be synonymous with "composition." Further, "material set" and "kit" are understood to be compositions comprising one or more components where the different components in the compositions are each contained in one or more containers, separately or in any combination, prior to and during printing but these components can be combined together during printing. The containers can be any type of a vessel, box, or receptacle made of any material.

The build material compositions include the host metal and the custom flow additive formed by the freezing and lyophilization of the nanoparticle-containing dispersion. In example compositions, the host metal is present in an amount of at least 90 wt % based on a total weight of the build material composition; and the individual flow additive nanoparticles, the agglomerate fragments, or the combination thereof is present in an amount of less than 10 wt % based on the total weight of the composition. In the examples disclosed herein, the build material composition is spreadable, having a Hausner Ratio less than 1.25.

As such, in examples of the present disclosure, the composition is mainly the host metal. The host metal may be in powder form, i.e., particles. In the present disclosure, the term "particles" means discrete solid pieces of components of the build material composition. As used herein, the term "particles" does not convey a limitation on the shape of the particles. As examples, particles may be spherical beads or irregularly shaped beads of lower aspect ratio.

Sintering of the host metal particles usually happens below a melting temperature of the host metal. The sintering temperature of the host metal particles may be dependent, in part, on the size of the host metal particles. A host metal with a smaller average particle size will experience a faster sintering rate than a host metal having a larger average particle size. The rate of sintering of solid crystalline powders obeys Herring scaling law and is inversely proportional to the particle size by a power of between 2 and 4. Therefore, reducing a metal particle size may allow faster sintering at a lower sintering temperature. Both the speed of sintering and the sintering temperature may beneficially alter a structure of the sintered part. For example, a fast sintering rate at a lower temperature may prevent large grain growth. The prevention of large grain growth may improve ultimate tensile strength, yield strength, ductility and other mechanical properties of the final metal objects.

Thus, it may be desirable to use metal powders with the smallest particle size possible in 3D printing processes involving sintering. However, spreading of a powder into uniform thin layers of well-controlled thickness becomes increasingly difficult with decreased particle size. Without being held bound to any theory, it is believed that the reduced spreadability with decreasing particle size is due to inter-particle forces (i.e., van der Waals, electrostatic attraction, etc.) becoming significantly stronger than gravitational pull. Therefore, in general, powders become increasingly cohesive when a particle size of the powder is well below 100 µm. As such, smaller particles agglomerate together and the powders lose flowability. In the case of metals, even powders with spherical particles become non-spreadable into thin layers when the average particle size of the metal particles is within or below the range of about 12 µm to about 20 µm; especially when a fraction of particles present in the powder is within or smaller than the range of about 7 µm to about 10 µm. It is possible to remove the small particles from a metal powder by classification; however, classification is an additional process that adds to cost and removes the beneficial effects of small particles discussed above.

Comparative flow additives include fumed oxide powders, which have been used to decrease the inter-particle cohesive forces in difficult-to-flow powders. It is believed that many, if not all, current commercially available comparative flow additives are based on different grades of fumed silica and, in some cases, fumed aluminum oxides. In some cases, precipitated colloidal silica powders have been used as comparative flow additives after surface modification.

These comparative flow additives are very low density powders made of loosely aggregated nano-particles. A typical particle size for the comparative flow additives ranges from about 1.5 to about 3 orders of magnitude smaller than the particle size of the cohesive powders to which the comparative flow additives are added. When added and mixed with cohesive host powders, these comparative flow additive nano-particles or their small aggregates stick to surfaces of the host particles. The host particle surfaces are coated with flow additive nano-spacers, thereby preventing agglomeration of the cohesive powder particles. Thus, formerly cohesive powders treated with an effective amount of the comparative flow additive (about 0.01 weight percent to 1.0 weight percent of the host powder) may be made flowable, with the potential of being spread in thin uniform layers. As used herein, better flowability of a composition means that the composition has better spreadability.

FIG. 1 depicts a graph of Hausner Ratio as a function of weight percentage for a mixture of a fumed silica flow aid in 316L stainless steel powder. The 316L stainless steel powder had an "as is" Hausner Ratio of about 1.37. Hausner Ratio (H[n]) is a powder flowability metric that can be measured by a tap density test. More specifically, the Hausner Ratio is a ratio of powder densities after and before compaction by tapping. A lower H[n] correlates to better flowability. Metal powders with a spherical particle shape and a Hausner Ratio of less than or equal to about 1.20 may be suitable for 3D printing applications with. In some cases, suitable flowability may be found with a Hausner Ratio up to about 1.25. The function depicted in FIG. 1 was determined from laboratory test results. The stainless steel powder was SAE 316L, grade −22 μm (80%) powder from "Sandvik", (average particle diameter is approximately 11 μm). The fumed silica flow aid was Aerosil R812, available from Evonik.

It has been found that the comparative flow additives based on fumed oxides of silicon and aluminum discussed above cannot be used to improve flowability of metal powders used in certain additive manufacturing processes (e.g., those involving sintering) without negatively affecting strength-related structural properties of the final metal objects produced during the sintering process. Silica and alumina are not reduced during sintering processes with or without a reducing atmosphere. As such, both silica and alumina flow additive nano-particles become part of the structure of the final metal object. More particularly, the silica and alumina flow additive nano-particles get incorporated into grain boundary space of the final metal object structure. The presence of silica and/or alumina inclusions in a metal object structure diminishes the mechanical strength and ductility of the metal object. Thus, although comparative flow additives may improve flowability of certain metal powders, the comparative flow additives deleteriously affect mechanical properties of 3D objects formed therefrom.

The examples of the method disclosed herein generate a low density, loosely aggregated flow additive agglomerates, which have a structure similar to comparative flow additives based on fumed oxides of silicon and aluminum. The flow additive agglomerates disclosed herein can easily break down to flow additive nanoparticles when mixed with a host metal, and thus improve host metal flowability in a manner similar to or better than comparative flow additives based on fumed oxides of silicon and aluminum. However, unlike the comparative flow additives based on fumed oxides of silicon and aluminum, the composition of the flow additive nanoparticles may be tailored for a particular application. As examples, the composition of the flow additive nanoparticles (which form the agglomerates) may be customized for a 3D printing process that involves sintering. As one example, the flow additive nanoparticles include a material that reduces to form one or more elemental metals that become integrated with the host metal during sintering (and thus do not deleteriously affect the mechanical properties). In other examples, the flow additive is a material that is pyrolyzable at a pyrolysis temperature that is less than a sintering temperature of the host metal. In these other examples, the flow additive is removed during sintering, and thus, unlike the comparative flow additives, do not become part of the sintered, final metal object.

Figure 2:
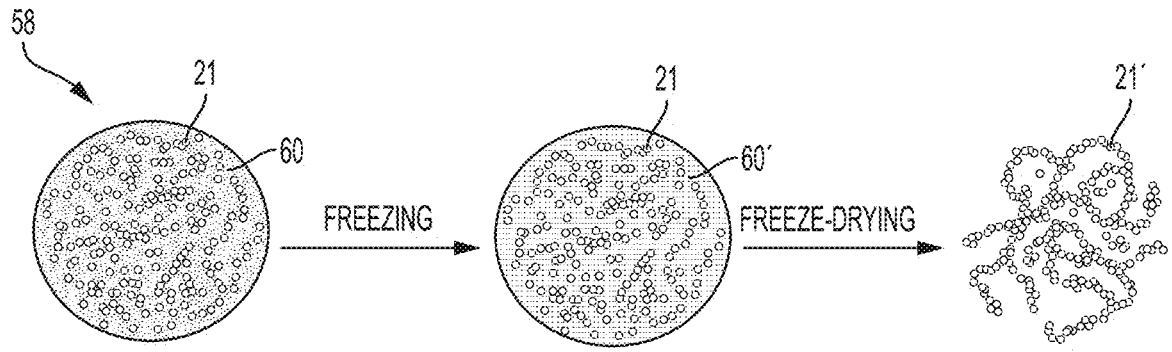
FIG. 2 is a schematic diagram depicting an example method for forming example flow additive agglomerates.

Referring now to FIG. 2, an example of a method for making the flow additive agglomerates 21' is depicted. At the outset (as shown at the left hand side of FIG. 2), a dispersion 58 of flow additive nanoparticles 21 in a liquid 60 is prepared.

The liquid 60 may be water. The flow additive nanoparticles 21 may be present in the dispersion 58 in an amount ranging from about 0.02 vol % to about 40 vol % based on a total volume of the dispersion.

The flow additive nanoparticles 21 may have any composition that is suitable for the intended application in which the flow additive nanoparticles 21 are to be used. For example, in 3D printing methods involving sintering, the flow additive nanoparticles 21 may be selected from the group consisting of: i) a metal containing compound that is reducible to at least one elemental metal in a reducing environment at a reducing temperature that is less than or equal to a sintering temperature of the host metal, wherein the at least one elemental metal is capable of being incorporated into a bulk metal phase of the host metal in a final metal object, or ii) an organic material that is pyrolyzable at a pyrolysis temperature that is less than the sintering temperature of the host metal, and iii) a crosslinked organic particle that is pyrolyzable at a pyrolysis temperature that is less than the sintering temperature of the host metal. An example of the crosslinked organic particle is an organic particle having crosslinked polymer chains, a glass transition temperature ($T_g$) of at least 90° C., and a primary particle size of 50 nm or less.

In some examples when the flow additive nanoparticles 21 include a metal containing compound, the metal containing compound may be a transition metal oxide or a mixed transition metal oxide. The transition metal oxide may be selected from the group consisting of a vanadium oxide, a chromium oxide, an iron oxide, a cobalt oxide, a nickel oxide, and a copper oxide. The mixed transition metal oxide may be any combinations of the previously listed oxide, such as a nickel iron oxide. The elemental metal produced by reduction of the transition metal oxide, or the elemental metals produced by reduction of the mixed transition metal oxide may be easily incorporated into bulk steel (e.g., by alloying interaction). In other examples when the flow additive nanoparticles 21 are a metal containing compound, the metal containing compound may be a thermally decomposing precursor selected from the group consisting of a transition metal hydroxide, a transition metal oxo-hydroxide, dispersions of alloying metal oxide particles, and metal salts that are capable of producing a metal oxide upon thermal decomposition. The thermally decomposing precursor may be thermally decomposed directly to one or more elemental metals; or to a thermal decomposition product, and the thermal decomposition product can be reduced in a reducing environment to produce the elemental metal(s). The elemental metal(s) produced from a thermally decomposing precursor may also be easily incorporated into bulk steel.

The metal-containing compound example of the flow additive nanoparticles 21 may have an average flow additive particle size ranging from about 5 nanometers to about 200 nanometers.

When the flow additive nanoparticles 21 include the non-crosslinked organic material, the non-crosslinked organic material may be a heteropolymer including a hydrophobic component that makes up from about 65% to about 99.9% (by weight) of the heteropolymer, and a hydrophilic component that makes up from about 0.1% to about 35% (by weight) of the heteropolymer, where the hydrophobic component may have a lower glass transition temperature than the hydrophilic component.

Examples of monomers that may be used to form the hydrophobic component of the non-crosslinked organic material include $C_4$ to $C_8$ alkyl acrylates or methacrylates, styrene, substituted methyl styrenes, polyol acrylates or methacrylates, vinyl monomers, vinyl esters, or the like. Some specific examples include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexy methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, tridecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes (e.g., α-methyl styrene, p-methyl styrene), vinyl chloride, vinylidene chloride, vinylbenzyl chloride, acrylonitrile, methacrylonitrile, N-vinyl imidazole, N-vinylcarbazole, N-vinyl-caprolactam, combinations thereof, derivatives thereof, or mixtures thereof.

The heteropolymer may be formed of at least two of the previously listed hydrophobic monomers, or at least one of the previously listed hydrophobic monomers and a higher $T_g$ hydrophilic monomer, such as an acidic monomer. Examples of acidic monomers that can be polymerized to form non-crosslinked organic material include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryoyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, combinations thereof, derivatives thereof, or mixtures thereof. Other examples of high $T_g$ hydrophilic monomers include acrylamide, methacrylamide, monohydroxylated monomers, monoethoxylated monomers, polyhydroxylated monomers, or polyethoxylated monomers.

The non-crosslinked organic material example of the flow additive nanoparticles 21 may be produced by emulsion polymerization or co-polymerization. The non-crosslinked organic material example of the flow additive nanoparticles 21 may have an average flow additive particle size ranging from about 5 nanometers to about 200 nanometers.

Some examples of the flow additive nanoparticles 21 include organic particles having crosslinked polymer chains, a glass transition temperature ($T_g$) of at least 90° C., and a primary particle diameter of 100 nm or less. In these examples, the crosslinked polymer chains may include a hydrophobic monomer having a glass transition temperature ($T_g$) of equal to or greater than 90° (i.e., at least 90° C.) and water solubility lower than 0.1%, and a multi-functional crosslinking monomer, alone or in combination with an acidic monomer or a low $T_g$ monomer (having a $T_g$ less than 90° C.). In these examples, the crosslinked organic particle includes from about 55 wt % to about 95 wt % of the hydrophobic monomer, from about 5 wt % to about 40 wt % of the multi-functional crosslinking monomer, and from 0 wt % to about 10 wt % of the acidic monomer or the low $T_g$ monomer, all of which are based on a total weight of the organic particle. Some examples of the crosslinked organic polymer do not include either the acidic monomer or the low $T_g$ monomer.

In examples of the crosslinked organic polymer, the hydrophobic monomer is selected from the group consisting of isobornyl methacrylate, isobornyl acrylate, tert-butyl methacrylate, tert-butyl acrylamide, tert-butyl methacrylamide, N-phenylacrylamide, N-benzyl-methacrylamide, N-tert-octylacrylamide, cyclohexylmethacrylate, 4-tert-butylcyclohexyl methacrylate, benzhydryl methacrylate, methyl methacrylate, phenyl methacrylate, dihydrodicyclopentadienyl acrylate, 4-tert-butylstyrene, 2,6-dichlorostyrene, 2,5-dimethylstyrene, 4-methylstyrene, 3-methylstyrene, styrene, 2,4,6-trimethylstyrene, 4-acetoxystyrene, and combinations thereof; and the multi-functional crosslinking monomer is selected from the group consisting of ethylene glycol dimethacrylate, ethylene glycol diacrylate, diethylene glycol dimethacrylate, diethylene glycol diacrylate, 1,4-butanediol diacrylate, 1,3-butanediol dimethacrylate, 1,4-butanediol dimethacrylate, 1,6-hexanediol diacrylate, 1,6-hexanediol dimethacrylate, N—N'-hexamethylenebisacrylamide, triethylene glycol dimethacrylate, zinc methacrylate, pentaerythritol tetraacrylate, pentaerythritol triacrylate, N—N'-ethylenebisacrylamide, N—N'-methylenebisacrylamide, 1,4-divinylbenzene, 1,3-divinylbenzene, and combinations thereof. In some examples of the crosslinked organic polymer, the hydrophobic monomer and the multi-functional crosslinking monomer are selected from the previous examples, and the acidic monomers may be selected from the group consisting of 2-acrylamido-2-methy-1-propanesulfonic acid, methacrylic acid, and combinations thereof. In other examples of the crosslinked organic polymer, the hydrophobic monomer and the multi-functional crosslinking monomer are selected from the previous examples, and the low $T_g$ monomers include n-butyl acrylate, n-butyl methacrylate, 2-ethylhexyl acrylate, ethyl acrylate, n-propyl acrylate, benzyl acrylate, and combinations thereof. It is to be understood that the amount of the low $T_g$ monomer does not lower the overall $T_g$ of the crosslinked organic particle below 90° C.

The crosslinked organic particle example of the flow additive nanoparticles 21 may be produced by emulsion polymerization or another co-polymerization technique. The crosslinked organic particle examples of the flow additive nanoparticles 21 may have an average flow additive particle diameter of 100 nm or less (e.g., ranging from about 5 nm to about 100 nm, or from about 10 nm to about 50 nm).

While some flow additive nanoparticles 21 have been described, it is to be understood that other nanoparticles 21 with other compositions may be used. For example, the flow additive nanoparticles 21 may be any composition that does not act as an adhesive for the host metal and that is relatively hydrophobic. Without being held bound to any theory, it is believed that a hydrophobic flow additive may resist being plasticized by water (e.g., by absorption of moisture from the surrounding environment).

Still referring to FIG. 2, after the dispersion 58 is formed, the dispersion 58 is frozen. The aqueous dispersion 58 of the flow additive nanoparticles 21 may be rapidly frozen. Freezing may take place at any suitable freezing temperature. Lower freezing temperatures may speed up the process, which can lead to flow additive nanoparticles 21 with the desirable shape, etc. In an example, freezing may be at or below 0° C., and in another example, freezing may be at or below −17° C. The rapid freezing of the aqueous dispersion of the organic particles freezes the structure of the flow additive nanoparticles 21. Freezing forms the solid mass shown in the center of FIG. 2, which includes the flow additive nanoparticles 21 held in place within the frozen liquid 60'.

The solid mass is then lyophilized (i.e., freeze dried). Lyophilization may take place in a vacuum chamber at temperatures starting as low as about −40° C. to about −50° C. The temperature may vary throughout the process, and may be slowly ramped up as water is removed. The less residual water that remains, the higher the drying temperature may be. The freeze drying may prevent the flow additive nanoparticles 21 from forming hard, difficult to break, agglomerates. The removal of the frozen liquid 60' via sublimation (during freeze drying) prevents the flow additive nanoparticles 21 from compacting into hard sediment as a result of capillary compaction forces created by liquid evaporation. The hard sediment resulting from liquid evaporation can be much larger (e.g., about 20 μm or more) than the primary nanoparticles and does not exhibit flow additive properties. In contrast, as a result of lyophilization in the method disclosed herein, the flow additive nanoparticles 21 loosely aggregate together to form low density, fractal structures that are easily broken when mixed with the host metal 15. The low density, fractal structures or flow additive agglomerate 21' are shown at the right side of FIG. 2.

The flow additive agglomerates 21' are highly structured agglomerates of flow additive nanoparticles 21. The flow additive agglomerates 21' have a relatively low density ranging from about 0.1% to 20% of a bulk density of the material of the flow additive nanoparticles 21. In another example, the flow additive agglomerates 21' have a relatively low density ranging from about 0.5% to 20% of a bulk density of the material of the flow additive nanoparticles 21. In some examples, the highly structured flow additive agglomerates 21' may have an average flow additive agglomerate particle size ranging from about 100 nm to about 300 μm, or from about 1 μm to about 300 μm, or from about 1 μm to about 200 μm. The agglomerates 21' are composed from primary particles (i.e., the flow additive nanoparticles 21) having a primary particle size in the nano-range, as mentioned hereinabove. The agglomerates 21' also have meso-sized pores. These mesopores may range in size from about 10 nm to about 1 μm, and are present between the loosely aggregated flow additive nanoparticles 21. In a container of the flow additive formed by this method, the primary flow additive nanoparticles 21 may be encountered as low density, often fractal structures or agglomerates 21'.

Figure 3:
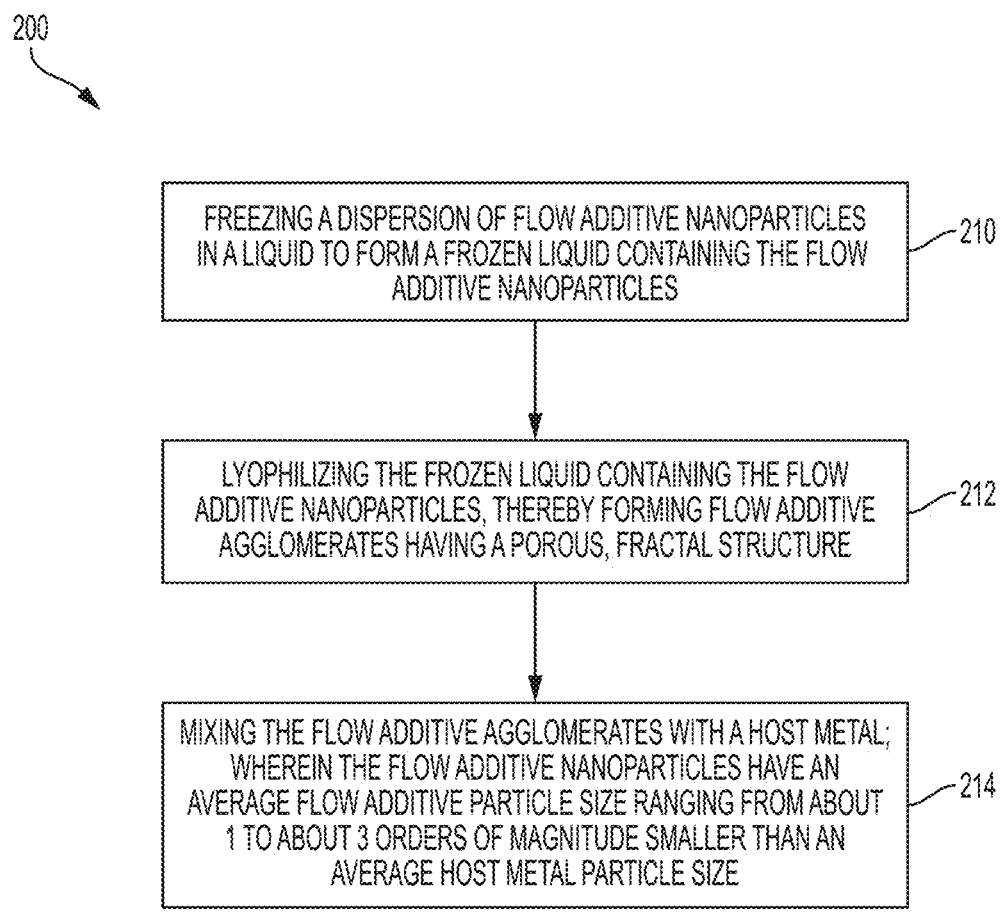
FIG. 3 is a flow diagram depicting an example of a method for making a build material composition according to the present disclosure.
Figure 4:
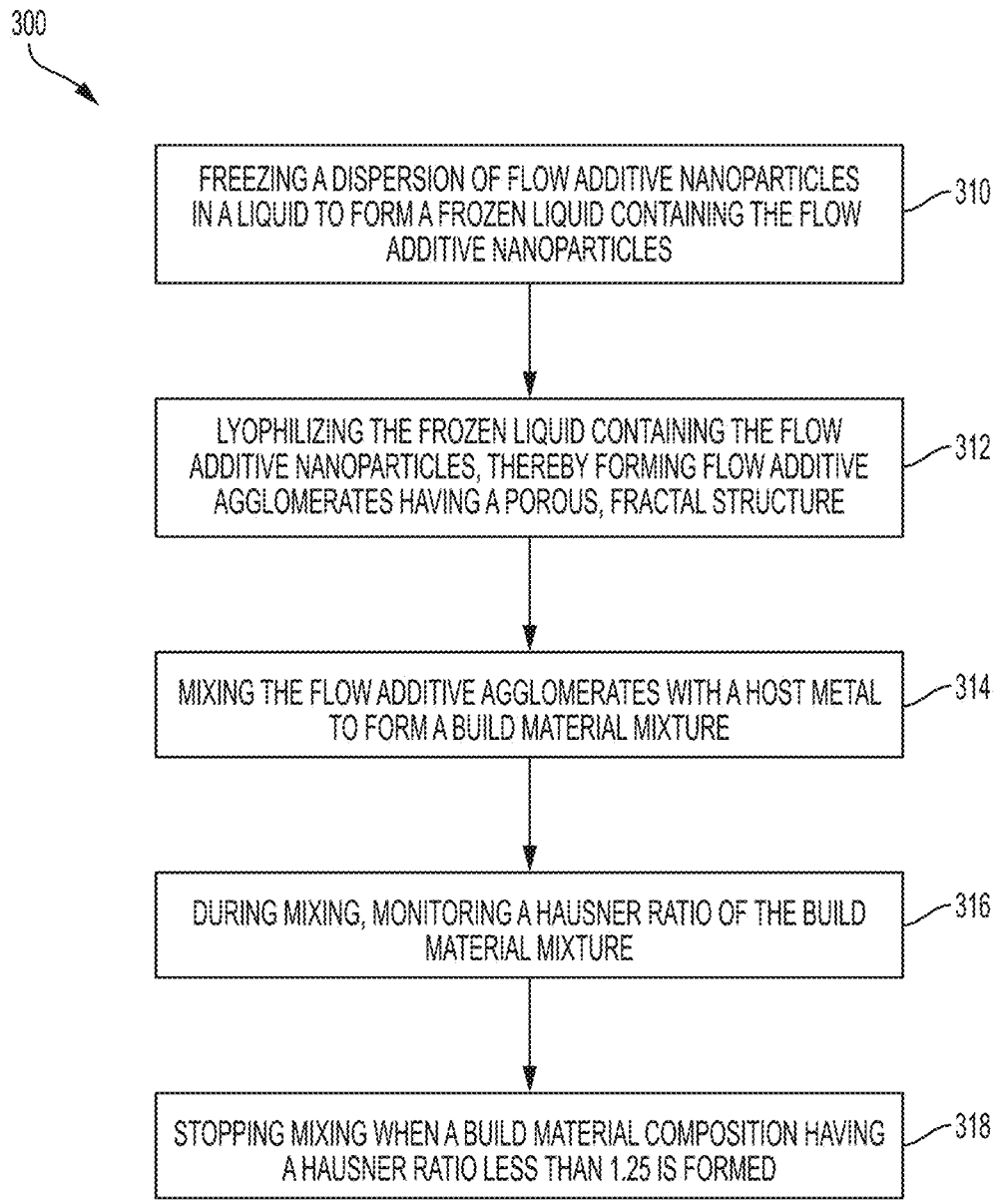
FIG. 4 is a flow diagram depicting another example of a method for making a build material composition according to the present disclosure.

The method described in reference to FIG. 2 may be used in a method for making a build material composition for 3D printing, examples of which are depicted in FIGS. 3 and 4.

In the example shown in FIG. 3, the method 200 includes freezing a dispersion 58 of flow additive nanoparticles 21 in a liquid 60 to form a frozen liquid 60' containing the flow additive nanoparticles 21 (as shown at reference numeral 210); lyophilizing the frozen liquid 60' containing the flow additive nanoparticles 21, thereby forming flow additive agglomerates 21' having a porous, fractal structure (as shown at reference numeral 212); and mixing the flow additive agglomerates 21' with a host metal (15, shown in FIGS. 5 and 6), wherein the flow additive nanoparticles 21 have an average flow additive particle size ranging from about 1 to about 3 orders of magnitude smaller than an average host metal particle size of the host metal 15 (as shown at reference numeral 214).

The formation of the dispersion 58, freezing, and lyophilization may be performed as described in reference to FIG. 2. Any of the materials, amounts of materials, conditions (for freezing and lyophilizing), etc. may be used in the method 200. In an example of the method 200, freezing the dispersion 58 of flow additive nanoparticles 21 is accomplished at a temperature at or below 0° C.; and lyophilizing the frozen liquid 60' containing the flow additive nanoparticles 21 is accomplished in a vacuum chamber at a temperature as low as from about −40° C. to about −50° C.

Once the flow additive agglomerates 21' are formed, they may be mixed with the host metal 15. In an example, the host metal 15 may be a single phase metallic material composed of one element. In this example, the sintering temperature of the build material composition 12 may be below the melting point of the single element. In another example, the host metal 15 may be composed of two or more elements, which may be in the form of a single phase metallic alloy or a multiple phase metallic alloy. In these other examples, sintering generally occurs over a range of temperatures.

Some examples of the host metal 15 include steels, stainless steel, bronzes, titanium (Ti) and alloys thereof, aluminum (Al) and alloys thereof, nickel (Ni) and alloys thereof, cobalt (Co) and alloys thereof, iron (Fe) and alloys thereof, nickel cobalt (NiCo) alloys, gold (Au) and alloys thereof, silver (Ag) and alloys thereof, platinum (Pt) and alloys thereof, tungsten (W) and alloys thereof, and copper (Cu) and alloys thereof. Some specific examples include AlSi10Mg, 2xxx series aluminum, 4xxx series aluminum, CoCr MP1, CoCr SP2, MaragingSteel MS1, Hastelloy C, Hastelloy X, NickelAlloy HX, Inconel IN625, Inconel IN718, SS GP1, SS 17-4PH, SS 316L, SS 430L, Ti6Al4V, and Ti-6Al-4V ELI7. While several example alloys have been provided, it is to be understood that other alloys may be used.

In some examples, the particles of the host metal 15 may have an average host metal particle size less than 20 μm. In some examples, some host metal particles in a mixture of host metal particles may be as small as about 1 μm. The flow additive nanoparticles 21 have an average flow additive particle size ranging from about 1 to about 3 orders of magnitude smaller than the average host metal particle size. In some examples, the average host metal particle size is less than 20 μm, and the average flow additive primary particle size may range from about 5 nanometers to about 200 nanometers. In other examples, the average host metal particle size is less than 20 μm, and the average flow additive primary particle size is 50 nm or less.

Any suitable conditions may be used to mix the host metal 15 with the flow additive agglomerates 21'. As examples, mixing may be accomplished in a rotating container, using a mechanical mixer, or using a hand mixer. Mixing may also be accomplished at ambient temperatures, which may range from about 18° C. to about 25° C. In some examples (as described further in reference to FIG. 4), mixing may be accomplished for a suitable time period, which may depend, at least in part, upon how long it takes for the mixture to obtain a desirable Hausner Ratio. As such, some examples of the method 200 include stopping mixing when the build material composition 12 has a Hausner Ratio less than 1.25.

The mixing breaks the flow additive agglomerates 21' into either individual flow additive nanoparticles 21, agglomerate fragments, or combinations thereof; and the individual flow additive nanoparticles 21, the agglomerate fragments, or the combination thereof become disposed on a surface of the particles of the host metal 15. As used herein, the term "agglomerate fragments" refers to a few flow additive nanoparticles 21 that are stuck together, but are smaller than the flow additive agglomerates 21'. The flow additive nanoparticles 21 and/or the agglomerate fragments stick to a surface of the host metal 15 particles and improve the flowability of the host metal 15.

Referring now to FIG. 4, another example of the method 300 is depicted. In this example, the method 300 includes freezing a dispersion 58 of flow additive nanoparticles 21 in a liquid 60 to form a frozen liquid 60' containing the flow additive nanoparticles 21 (as shown at reference numeral 310); lyophilizing the frozen liquid 60' containing the flow additive nanoparticles 21, thereby forming flow additive agglomerates 21' having a porous, fractal structure (as shown at reference numeral 312); mixing the flow additive agglomerates 21' with a host metal 15 to form a build material mixture (as shown at reference numeral 314); during mixing, monitoring a Hausner Ratio of the build material mixture (as shown at reference numeral 316); and stopping mixing when a build material composition 12 having a Hausner Ratio less than 1.25 is formed.

The formation of the dispersion 58, freezing, and lyophilization may be performed as described in reference to FIG. 2. Any of the materials, amounts of materials, conditions (for freezing and lyophilizing), etc. may be used in the method 300. In an example of the method 300, freezing the dispersion 58 of flow additive nanoparticles 21 is accomplished at a temperature at or below 0° C.; and lyophilizing the frozen liquid 60' containing the flow additive nanoparticles 21 is accomplished in a vacuum chamber at a temperature as low as from about −40° C. to about −50° C.

The mixing of the host metal 15 and the flow additive agglomerates 21' may be performed as described in reference to FIG. 3.

In this example of the method 300, the Hausner Ratio may be monitored throughout the mixing process to determine when the desirable Hausner Ratio has been obtained. Monitoring the Hausner Ratio may be accomplished by periodically testing the Hausner Ratio of the mixture throughout the mixing process. In an example, simple mixing of the host metal 15 with the flow additive agglomerates 21' in a rotating container for about 1 hour to about 2 hours may be sufficient mixing to obtain a uniform Hausner Ratio throughout the mixture. Very long mixing, (e.g., 2 days or more) may result in flowability degradation (i.e., an increase in the Hausner Ratio over the Hausner Ratio that is achieved by an amount of mixing that has a duration at a threshold of sufficiency to be effective).

Figure 5:
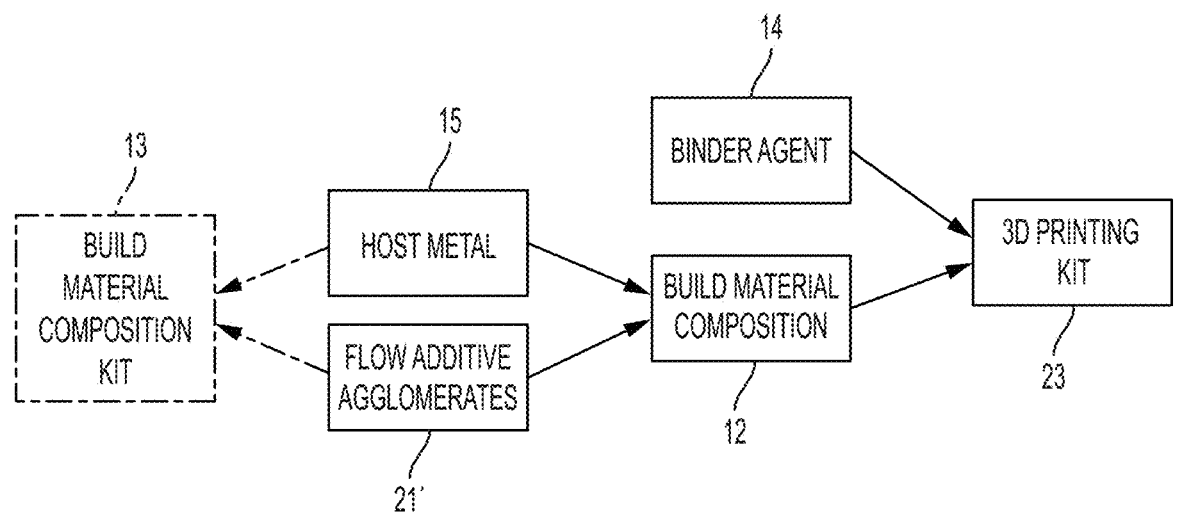
FIG. 5 is a block diagram that depicts components of a build material composition and a three-dimensional (3D) printing kit as disclosed herein.

In some examples, the flow additive agglomerates 21' are included in a 3D printing kit, such as the build material composition kit 13 shown in FIG. 5. In an example, the kit 13 includes the host metal 15 and the flow additive agglomerates 21' (formed by the method described in reference to FIG. 2) that are to be mixed with the host metal 15. The components 13, 21' of this kit 13 may be used to form a build material composition 12 for use in 3D printing, or to form another composition that is to be used in an application that involves spreading of the composition. In a more specific example, the kit 13, comprises a host metal 15, and flow additive agglomerates 21' to be mixed with the host metal 15, the flow additive agglomerates 21' having a porous, fractal structure and including flow additive primary particles 21 that: have an average flow additive primary particle size ranging from about 1 to about 3 orders of magnitude smaller than an average host metal particle size; and are reducible to at least one elemental metal in a reducing environment at a reducing temperature that is less than or equal to a sintering temperature of the host metal, or are pyrolyzable at a pyrolysis temperature that is less than the sintering temperature of the host metal. The components of the build material composition kit 13 may be maintained separately until used together in examples of the 3D printing method disclosed herein.

In some examples, the kit 13 may consist of the flow additive agglomerates 21' and the metal host 15 with no other components. In other examples, the build material composition kit 13 may further include a binder agent 14 to be applied, via an inkjet printhead, to at least a portion of a layer of a build material composition 12 formed from mixing the flow additive agglomerates 21' with the host metal 15.

As shown in FIG. 5, the flow additive agglomerates 21' and the metal host 15 are mixed together to form the build material composition 12. The build material composition 12 may be included in another example of a 3D printing kit 23. In this example, the kit 23 includes the build material composition 12 and a binder agent 14 to be applied to at least a portion of a layer of the build material composition 12 via an inkjet printhead to pattern a cross-section of an intermediate part. The kit 23 may consist of the build material composition 12 and the binder agent 23 with no other components. The components of the kit 23 may be maintained separately until used together in examples of the 3D printing method disclosed herein.

Figure 6:
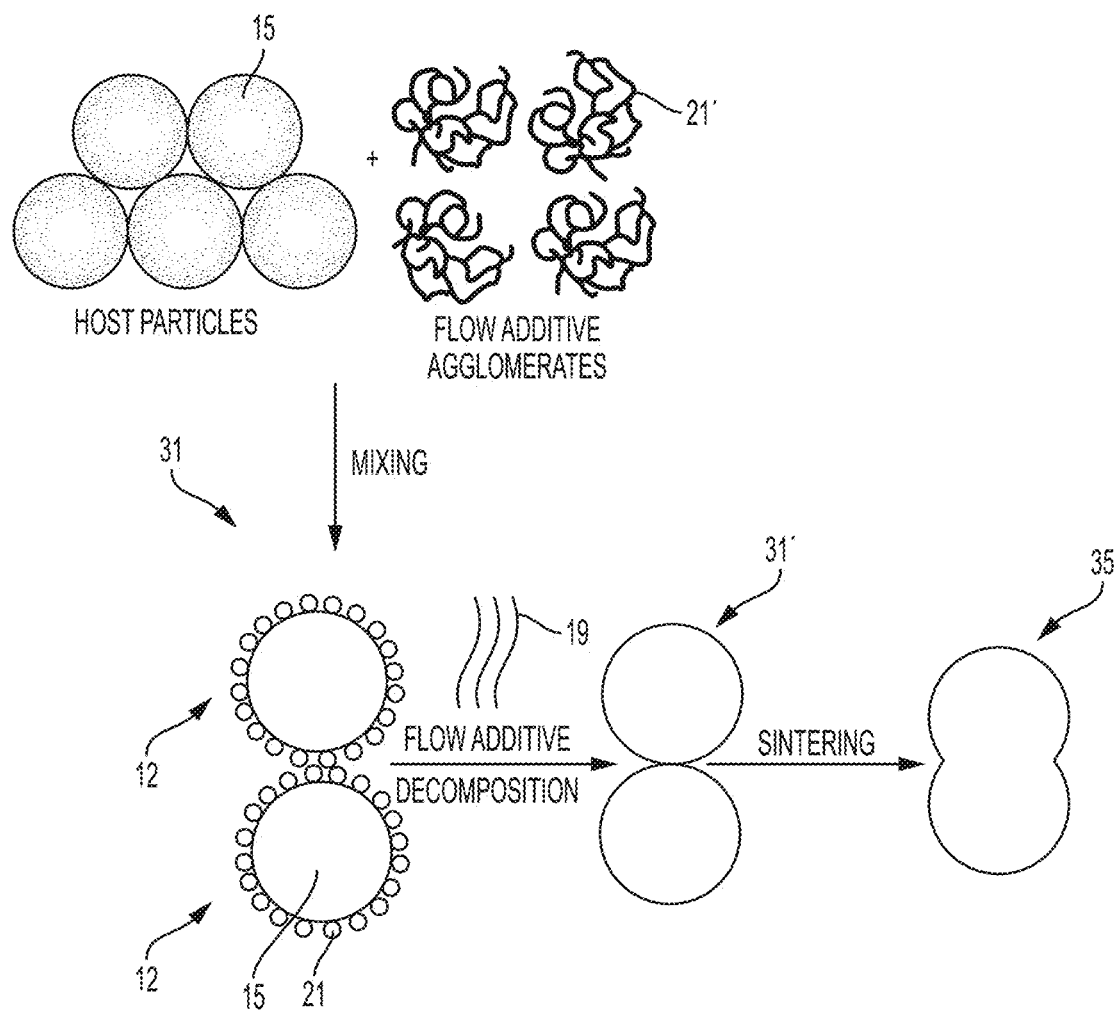
FIG. 6 is a schematic diagram depicting effects of processing on examples of the composition disclosed herein.

As mentioned herein, the flow additive agglomerates 21' and the host metal 15 are mixed to form a build material composition 12 for an additive manufacturing process. FIG. 6 is a diagram depicting the components (15, 21', 21) of the build material composition 12 going through certain steps of an example of an additive manufacturing process. FIG. 6 begins with the host metal particles 15 being mixed with the flow additive agglomerates 21'. As a result of mixing, the flow additive agglomerates 21' break up to form individual flow additive nanoparticles 21 and/or agglomerate fragments that stick to the host metal 15. This forms the build material composition 12. The build material composition 12 may be spread into a layer and patterned with a binder fluid 14 (not shown in FIG. 6) to form a portion of an intermediate part 31. During initial heating stages after patterning, the example flow aid 21 decomposes (e.g., by reduction, decomposition and reduction, or pyrolyzation), and is removed from the intermediate part 31. The vapor cloud 19 shown in FIG. 6 represents the flow additive nanoparticles 21 being removed from the build material composition 12. The remaining intermediate part 31' is then sintered to form the final 3D object or part 35.

An example of a printing method 400 that utilizes the build material composition 12 disclosed herein is shown in FIG. 7. The method 400 includes applying a build material composition 12 including: a host metal present 15 in an amount of at least 90 wt %, based on a total weight of the build material composition 12; and a flow additive 21 present in an amount of less than 10 wt % based on the total weight of the build material composition 12, the flow additive 21 including flow additive primary particles that: have an average flow additive primary particle size ranging from about 1 to about 3 orders of magnitude smaller than an average host metal particle size; and are selected from the group consisting of: a metal containing compound that is reducible to at least one elemental metal in a reducing environment at a reducing temperature less than or equal to a sintering temperature of the host metal, wherein the at least one elemental metal is capable of being incorporated into a bulk metal phase of the host metal in a final metal object; an organic material that is pyrolyzable at a pyrolysis temperature that is less than the sintering temperature of the host metal; and a cross-linked, organic material that is pyrolyzable at a pyrolysis temperature that is less than the sintering temperature of the host metal; wherein the build material composition 12 is spreadable, having a Hausner Ratio less than 1.25; and selectively applying a binder agent 14 on at least a portion of the build material composition 12.

In the examples disclosed herein, the binder agent 14 may include a binder and a liquid vehicle.

Examples of suitable binders include latexes (i.e., an aqueous dispersion of polymer particles), polyvinyl alcohol, polyvinylpyrrolidone, and combinations thereof.

Examples of polyvinyl alcohol include low weight average molecular weight polyvinyl alcohols (e.g., from about 13,000 to about 50,000), such as SELVOL™ PVOH 17 from Sekisui. Examples of polyvinylpyrrolidones include low weight average molecular weight polyvinylpyrrolidones (e.g., from about 15,000 to about 19,000), such as LUVITEC™ K 17 from BASF Corp.

The binder polymer particles may be any latex polymer (i.e., polymer that is capable of being dispersed in an aqueous medium) that is jettable via inkjet printing (e.g., thermal inkjet printing or piezoelectric inkjet printing). In some examples disclosed herein, the binder polymer particles are heteropolymers or co-polymers. The heteropolymers may include a more hydrophobic component and a more hydrophilic component. In these examples, the hydrophilic component renders the particles dispersible in the binder agent 14, while the hydrophobic component is capable of coalescing upon exposure to heat in order to temporarily bind the host metal particles 15.

The binder polymer particles of the latex may have several different morphologies. The binder polymer particles may include two different copolymer compositions, which may be fully separated core-shell polymers, partially occluded mixtures, or intimately comingled as a polymer solution. In an example, the polymer particles may be individual spherical particles containing polymer compositions of hydrophilic (hard) component(s) and/or hydrophobic (soft) component(s) that may be interdispersed according to IPN (interpenetrating networks), although it is contemplated that the hydrophilic and hydrophobic components may be interdispersed in other ways. For another example, the polymer particles may be made of a hydrophobic core surrounded by a continuous or discontinuous hydrophilic shell. This may lead to good water dispersibility and jetting reliability. For another example, the polymer particle morphology may resemble a raspberry, in which a hydrophobic core is surrounded by several smaller hydrophilic particles that are attached to the core. For still another example, the polymer particles may include 2, 3, or 4 or more relatively large particles (i.e., lobes) that are at least partially attached to one another or that surround a smaller polymer core. The latex polymer particles may have a single phase morphology, may be partially occluded, may be multiple-lobed, or may include any combination of the morphologies disclosed herein.

The latex polymer particles may have a weight average molecular weight ranging from about 5,000 to about 500,000. As examples, the weight average molecular weight of the latex particles may range from about 10,000 to about 500,000, from about 100,000 to about 500,000, or from about 150,000 to about 300,000.

Latex particles may include a heteropolymer including a hydrophobic component that makes up from about 65% to about 99.9% (by weight) of the heteropolymer, and a hydrophilic component that makes up from about 0.1% to about 35% (by weight) of the heteropolymer, where the hydrophobic component may have a lower glass transition temperature than the hydrophilic component. In general, a lower content of the hydrophilic component is associated with easier use of the latex particles under typical ambient conditions. The glass transition temperature of the latex particles may range from about −20° C. to about 130° C., or in a specific example, from about 60° C. to about 105° C. The particle size of the latex particles may range from about 10 nm to about 300 nm.

Examples of monomers that may be used to form the hydrophobic component of the binder polymer particles may include C4 to C8 alkyl acrylates or methacrylates, styrene, substituted methyl styrenes, polyol acrylates or methacrylates, vinyl monomers, vinyl esters, ethylene, maleate esters, fumarate esters, itaconate esters, or the like. Some specific examples include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexy methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, tridecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes (e.g., α-methyl styrene, p-methyl styrene), 1,3-butadiene, vinyl chloride, vinylidene chloride, vinylbenzyl chloride, acrylonitrile, methacrylonitrile, N-vinyl imidazole, N-vinylcarbazole, N-vinyl-caprolactam, combinations thereof, derivatives thereof, or mixtures thereof.

The heteropolymer may be formed of at least two of the previously listed monomers, or at least one of the previously listed monomers and a higher $T_g$ hydrophilic monomer, such as an acidic monomer. Examples of acidic monomers that can be polymerized in forming the latex polymer particles include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, combinations thereof, derivatives thereof, or mixtures thereof. Other examples of high $T_g$ hydrophilic monomers include acrylamide, methacrylamide, monohydroxylated monomers, monoethoxylated monomers, polyhydroxylated monomers, or polyethoxylated monomers.

In an example, the selected monomer(s) is/are polymerized to form a polymer, heteropolymer, or copolymer. In some examples, the monomer(s) are polymerized with a co-polymerizable surfactant. In some examples, the co-polymerizable surfactant can be a polyoxyethylene compound. In some examples, the co-polymerizable surfactant can be a HITENOL® compound e.g., polyoxyethylene alkylphenyl ether ammonium sulfate, sodium polyoxyethylene alkylether sulfuric ester, polyoxyethylene styrenated phenyl ether ammonium sulfate, or mixtures thereof.

The binder polymer particles may have a particle size that can be jetted via thermal inkjet printing or piezoelectric printing or continuous inkjet printing. In an example, the particle size of the binder polymer particles ranges from about 10 nm to about 300 nm.

Any suitable polymerization process may be used to prepare the binder polymer particles. In examples, the aqueous dispersion of polymer particles (latexes) may be produced by emulsion polymerization or co-polymerization of any of the previously listed monomers.

In an example, the polymer particles may be prepared by polymerizing hydrophilic monomers to form the hydrophilic component and attaching the hydrophilic component onto the surface of the hydrophobic component.

In another example, each of the polymer particles may be prepared by polymerizing the hydrophobic monomers and the hydrophilic monomers at a ratio of the hydrophobic monomers to the hydrophilic monomers that ranges from 5:95 to 30:70. In this example, the hydrophobic monomers may dissolve in the hydrophilic monomers.

In still another example, each of the binder polymer particles may be prepared by starting the polymerization process with the hydrophobic monomers, then adding the hydrophilic monomers, and then finishing the polymerization process. In this example, the polymerization process may cause a higher concentration of the hydrophilic monomers to polymerize at or near the surface of the hydrophobic component.

In still another example, each of the polymer particles may be prepared by starting a copolymerization process with the hydrophobic monomers and the hydrophilic monomers, then adding additional hydrophilic monomers, and then finishing the copolymerization process. In this example, the copolymerization process may cause a higher concentration of the hydrophilic monomers to copolymerize at or near the surface of the hydrophobic component.

Other suitable techniques, specifically for generating a core-shell structure, may be used, such as: i) grafting a hydrophilic shell onto the surface of a hydrophobic core, ii) copolymerizing hydrophobic and hydrophilic monomers using ratios that lead to a more hydrophilic shell, iii) adding hydrophilic monomer (or excess hydrophilic monomer) toward the end of the copolymerization process so there is a higher concentration of hydrophilic monomer copolymerized at or near the surface, or iv) any other method known in the art to generate a more hydrophilic shell relative to the core.

The hydrophobic monomers and/or the hydrophilic monomers used in any of these example methods may be any of the hydrophobic monomers and/or the hydrophilic monomers (respectively) listed above. In an example, the hydrophobic monomers are selected from the group consisting of C4 to C8 alkyl acrylate monomers, C4 to C8 alkyl methacrylate monomers, styrene monomers, substituted methyl styrene monomers, vinyl monomers, vinyl ester monomers, and combinations thereof; and the hydrophilic monomers are selected from the group consisting of acidic monomers, unsubstituted amide monomers, alcoholic acrylate monomers, alcoholic methacrylate monomers, C1 to C2 alkyl acrylate monomers, C1 to C2 alkyl methacrylate monomers, and combinations thereof.

The resulting binder polymer particles may exhibit a core-shell structure, a mixed or intermingled polymeric structure, or some other morphology.

In some examples, the binder polymer particles have a MFFT or a glass transition temperature ($T_g$) that is greater (e.g., >) than ambient temperature. In other examples, the binder polymer particles have a MFFT or $T_g$ that is much greater (e.g., >>) than ambient temperature (i.e., at least 15° higher than ambient). As mentioned herein, "ambient temperature" may refer to room temperature (e.g., ranging about 18° C. to about 22° C.), or to the temperature of the environment in which the 3D printing method is performed. Examples of the 3D printing environment ambient temperature may range from about 40° C. to about 50° C. The MFFT or the $T_g$ of the bulk material (e.g., the more hydrophobic portion) of the polymer particles may range from 25° C. to about 125° C. In an example, the MFFT or the $T_g$ of the bulk material (e.g., the more hydrophobic portion) of the polymer particles is about 40° C. or higher. The MFFT or the $T_g$ of the bulk material may be any temperature that enables the polymer particles to be inkjet printed without becoming too soft at the printer operating temperatures.

The binder polymer particles may have a MFFT or $T_g$ ranging from about 125° C. to about 200° C. In an example, the binder polymer particles may have a MFFT or $T_g$ of about 160° C.

In an example, the binder is present in the binder agent 14 in an amount ranging from about 1 wt % to about 40 wt % based on a total weight of the binder agent. In another example, the binder is present in the binder agent 14 in an amount ranging from about 2 wt % to about 30 wt % based on the total weight of binder agent 14.

In addition to the binder, the binder agent 14 may also include water, co-solvent(s), surfactant(s) and/or dispersing aid(s), antimicrobial agent(s), and/or anti-kogation agent(s).

The co-solvent may be an organic co-solvent present in an amount ranging from about 0.5 wt % to about 40 wt % (based on the total weight of the binder agent 14). It is to be understood that other amounts outside of this range may also be used depending, at least in part, on the jetting architecture used to dispense the binder agent 14. The organic co-solvent may be any water miscible, high-boiling point solvent, which has a boiling point of at least 120° C. Classes of organic co-solvents that may be used include aliphatic alcohols, aromatic alcohols, diols, glycol ethers, polyglycol ethers, 2-pyrrolidones/pyrrolidinones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the gas generating liquid functional agent may include 2-pyrrolidone, 2-methyl-1,3-propanediol, 1-(2-hydroxyethyl)-2-pyrrolidone, 1,2-butanediol, or combinations thereof.

The binder agent 14 may also include surfactant(s) and/or dispersing aid(s). Surfactant(s) and/or dispersing aid(s) may be used to improve the wetting properties and the jettability of the binder agent 14. Examples of suitable surfactants and dispersing aids include those that are non-ionic, cationic, or anionic. Examples of suitable surfactants/wetting agents include a self-emulsifiable, non-ionic wetting agent based on acetylenic diol chemistry (e.g., SURFYNOL® SEF from Air Products and Chemicals, Inc.), a non-ionic fluorosurfactant (e.g., CAPSTONE® fluorosurfactants from DuPont, previously known as ZONYL FSO), and combinations thereof. In a specific example, the surfactant is a non-ionic, ethoxylated acetylenic diol (e.g., SURFYNOL® 465 from Air Products and Chemical Inc.). In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or secondary alcohol ethoxylates (commercially available as TERGITOL® TMN-6, TERGITOL® 15-S-7, TERGITOL® 15-S-9, etc. from The Dow Chemical Co.). In some examples, it may be desirable to utilize a surfactant having a hydrophilic-lipophilic balance (HLB) less than 10. Examples of suitable dispersing aid(s) include those of the SILQUEST™ series from Momentive, including SILQUEST™ A-1230. Whether a single surfactant or dispersing aid is used or a combination of surfactants and/or dispersing aids is used, the total amount of surfactant(s) and/or dispersing aid(s) may range from about 0.01 wt % to about 6 wt % based on the total weight of the binder agent 14.

The binder agent 14 may also include antimicrobial agent(s). Suitable antimicrobial agents include biocides and fungicides. Example antimicrobial agents may include the NUOSEPT® (Ashland Inc.), UCARCIDE™ or KORDEK™ or ROCIMA™ (Dow Chemical Co.), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT), and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof. In an example, the binder agent 14 may include a total amount of antimicrobial agents that ranges from about 0.1 wt % to about 1 wt %.

An anti-kogation agent may also be included in the binder agent 14. Kogation refers to the deposit of dried solids on a heating element of a thermal inkjet printhead. Anti-kogation agent(s) is/are included to assist in preventing the buildup of kogation, and thus may be included when the binder agent 14 is to be dispensed using a thermal inkjet printhead. Examples of suitable anti-kogation agents include oleth-3-phosphate (commercially available as CRODAFOS™ O3A or CRODAFOS™ N-3 acid) or dextran 500k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the binder agent 14 in an amount ranging from about 0.1 wt % to about 1 wt % of the total weight of the binder agent 14.

The balance of the binder agent 14 is water (e.g., deionized water). As such, the amount of water may vary depending upon the weight percent of the other binder agent 14 components.

Figure 8:
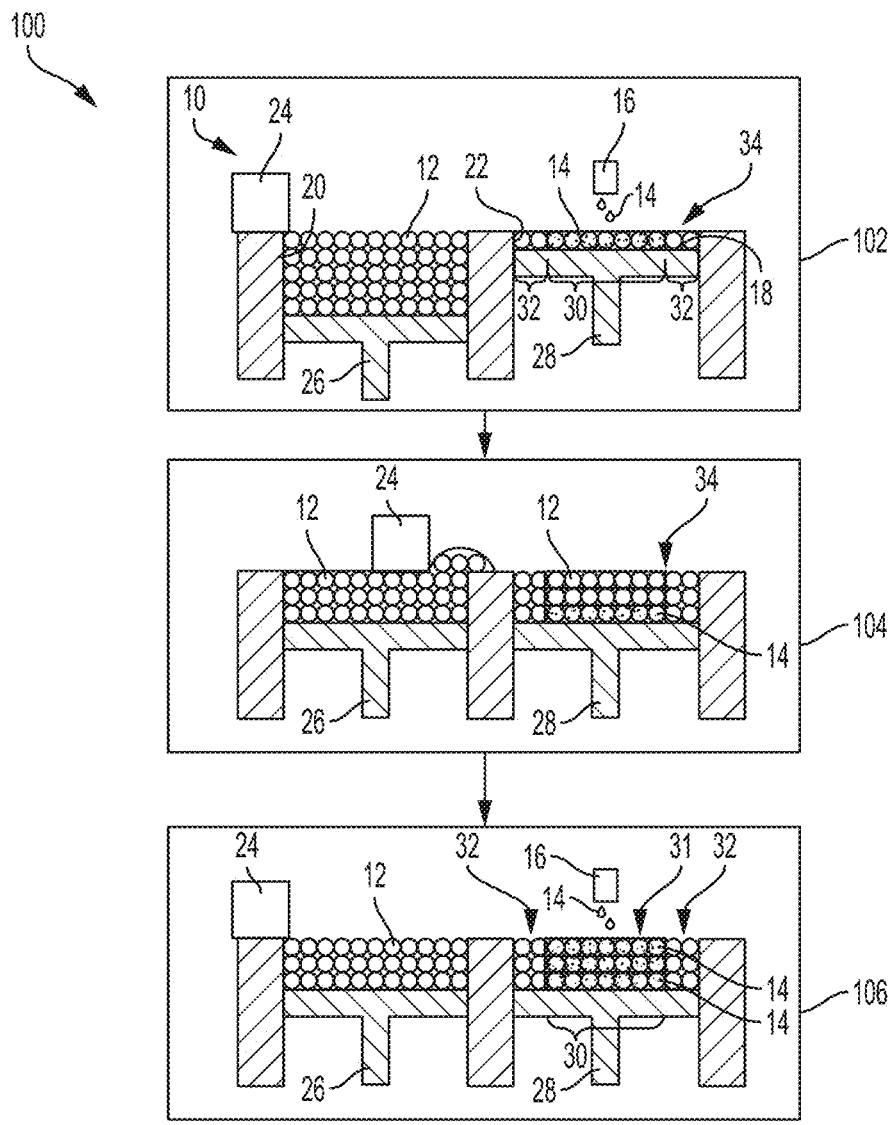
FIG. 8 depicts semi-schematic, partially cross-sectional views illustrating an example of a 3D printing method applying an example of the composition disclosed herein.

Examples of a printing method 100 and system 10, which include the build material composition 12 and the binder agent 14 are shown in FIG. 8.

As depicted in FIG. 8 at reference numeral 102, the 3D printing system 10 may include an inkjet applicator 16, a supply bed 20 (including a supply of build material composition 12), a delivery piston 26, a spreader 24, a fabrication bed 22, and a fabrication piston 28. The delivery piston 26 and the fabrication piston 28 may be the same type of piston, but are programmed to move in opposite directions. In an example, when a layer of the 3D part 35 is to be formed, the delivery piston 26 may be programmed to push a predetermined amount of the build material composition 12 out of the opening in the supply bed 20 and the fabrication piston 28 may be programmed to move in the opposite direction of the delivery piston 26 in order to increase the depth of the fabrication bed 22. The delivery piston 26 will advance enough so that when the spreader 24 pushes the build material composition 12 into the fabrication bed 22 and onto the build surface 18 or the previously formed layer, the depth of the fabrication bed 22 is sufficient so that a layer 34 of the build material composition 12 and the binder agent 14 may be formed in the fabrication bed 22. The spreader 24 is capable of spreading the build material composition 12 into the fabrication bed 22 to form the build material layer 34, which is relatively uniform in thickness.

In an example, the thickness of the build material layer 34 ranges from about 10 µm to about 70 µm, although thinner or thicker layers may also be used. For example, the thickness of the layer may range from about 20 µm to about 1000 µm. Depending upon the desired thickness for the layer 34 and the particle size(s) within the build material composition 12, the layer 34 that is formed in a single build material application may be made up of a single row of the build material composition 12 or several rows of build material composition 12.

While the system 10 is depicted, it is to be understood that other printing systems 10 may also be used. For example, another support member, such as a build area platform, a platen, a glass plate, or another build surface may be used instead of the fabrication bed 22. The build material composition 12 may be delivered from another source, such as a hopper, an auger conveyer, or the like. It is to be understood that the spreader 24 may be a rigid or flexible blade, which is a more common spreader for metal/metal alloy build materials. However, the spreader may also be replaced by other tools, such as a roller, or a combination of a roller and a blade.

Figure 9:
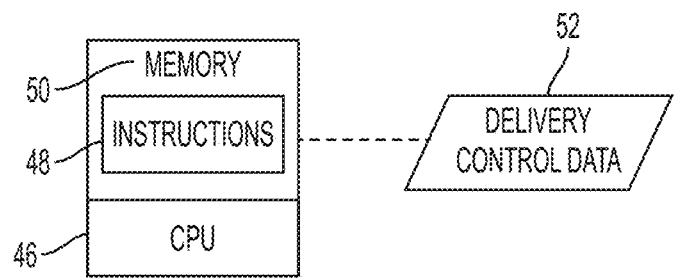
FIG. 9 is a block diagram illustrating a portion of a 3D printing system that can use an example of the composition disclosed herein.

Each of these physical elements of the 3D printing system 10 may be operatively connected to a central processing unit 46 (see FIG. 9) of the 3D printing system 10. The central processing unit 46 (e.g., running computer readable instructions 48 stored on a non-transitory, tangible computer readable storage medium) manipulates and transforms data represented as physical (electronic) quantities within the printer's registers and memories 50 in order to control the physical elements to create the 3D part 35. The data for the selective delivery of the binder agent 14, the build material composition 12, etc. may be derived from a 3D model of the 3D part 35 to be formed. For example, the instructions 48 may cause the controller to utilize an applicator (e.g., an inkjet applicator 16) to selectively dispense the binder agent 14, and to utilize a build material distributor (spreader 24) to dispense the build material composition 12. The central processing unit 46 controls the selective delivery (i.e. dispensing) of the binder agent 14 in accordance with delivery control data 52.

The binder agent 14 may be dispensed from any suitable applicator. As illustrated in FIG. 8 at reference number 102, the binder agent 14 may be dispensed from an inkjet applicator, such as a thermal inkjet printhead or a piezoelectric inkjet printhead. The printhead may be a drop-on-demand printhead or a continuous drop printhead. The inkjet applicator 16 may be selected to deliver drops of binder agent 14 at a resolution ranging from about 300 dots per inch (DPI) to about 1200 DPI. In other examples, the inkjet applicator 16 may be selected to be able to deliver drops of the binder agent 14 at a higher or lower resolution. The drop velocity may range from about 5 m/s to about 24 m/s and the firing frequency may range from about 1 kHz to about 100 kHz. The inkjet applicator 16 may include an array of nozzles through which it is able to selectively eject drops of fluid. In one example, each drop may be in the order of about 5 ng per drop, although it is contemplated that a higher (e.g., 100 ng) or lower (e.g., 1 ng) drop size may be used. In some examples, inkjet applicator 16 is able to deliver variable size drops of the binder agent 14.

The inkjet applicator(s) 16 may be attached to a moving XY stage or a translational carriage (neither of which is shown) that moves the inkjet applicator(s) 16 adjacent to the build surface 18 in order to deposit the binder agent 14 in desirable area(s) 30. In other examples, the applicator(s) 16 may be fixed while a support member (supporting the build surface 18) is configured to move relative thereto.

The inkjet applicator(s) 16 may be programmed to receive commands from the central processing unit 46 and to deposit the binder agent 14 according to a pattern of the layer 34 to be achieved. In an example, a computer model of the part 35 to be printed is generated using a computer aided design (CAD) program. The computer model of the 3D part 35 is sliced into N layers, which are then divided into voxels. The printing parameters for each voxel are computed based on the desired composition and physical properties of the part 35 to be printed. The printing parameters for each voxel may include the X, Y, and Z coordinates that define its location and the amount of the binder agent 14 (if any) that is to be received. The central processing unit 46 may then use this information to instruct the inkjet applicator(s) 16 as to how much (if any) of the binder agent 14 should be jetted into each voxel.

The inkjet applicator 16 selectively applies the binder agent 14 on those portions 30 of the layer 34 of the build material composition 12 that is to form the intermediate part, and ultimately the final 3D part 35. The binder agent 14 may not be applied on the entire layer 34, as shown at the portions 32.

After the binder agent 14 is selectively applied in a pattern on the desired portion(s) 30 of the layer 34 of build material composition 12, another layer of the build material composition 12 is applied, as shown at reference numeral 104 in FIG. 5, and patterned with the binder agent 14, as shown at reference numeral 106. The formation and patterning of additional layers may be repeated in order to form the intermediate part 31.

During and/or after formation of the intermediate part 31, liquid components of the binder agent 14 may be evaporated. At least substantially evaporation (with or without the application of heat) activates the binder, and the activated binder provides enough adhesive strength to hold the intermediate part 31 together with enough mechanical stability to survive removal from any non-patterned build material composition 12.

The intermediate part 31 may be extracted or separated from the non-patterned build material composition 12 (e.g., in portion(s) 32) by any suitable means. In an example, the intermediate part 31 may be extracted by lifting the intermediate part 31 from the non-patterned build material composition 12. Any suitable extraction tool may be used. In some examples, the intermediate part 31 may be cleaned to remove non-patterned build material composition 12 from its surface. In an example, the intermediate part 31 may be cleaned with a brush and/or an air jet, may be exposed to mechanical shaking, or may be exposed to other techniques that can remove the non-patterned build material composition 12.

The intermediate part 31 may then be placed in a heating mechanism (not shown). Examples of the heating mechanism include a conventional furnace or oven, a microwave, or devices capable of hybrid heating (i.e., conventional heating and microwave heating).

The heating mechanism may be used to perform a heating sequence, which involves exposing the intermediate part 31 to a decomposition/reduction temperature or a pyrolysis temperature that decomposes the flow additive 21. The heating sequence may form the 3D object 35 (see FIG. 6). In some examples, heating involves exposure to a series of temperatures.

The series of temperatures may involve heating the intermediate structure 31 to the decomposition/reduction or pyrolysis temperature, a de-binding temperature, and then to the sintering temperature. Briefly, the decomposition/reduction temperature decomposes/reduces the flow additive nanoparticle 21 to the elemental metal or the pyrolysis temperature removes the flow additive nanoparticle 21, and the de-binding temperature removes the binder, from the intermediate structure 31 to produce a binder-free intermediate structure 31', and the structure 31' may be sintered to form the final 3D object 35. Heating to decompose/pyrolyze, de-bind, and sinter may take place at several different temperatures, where the temperatures for decomposing/pyrolyzing and de-binding are lower than the temperature(s) for sintering. In some instances, heating to de-bind and heating to decompose/pyrolyze may take place at the same temperature or within the same temperature range (e.g., from about 300° C. to about 500° C.).

Heating to decompose/reduce is accomplished at a reducing temperature that is sufficient to thermally decompose/reduce the flow additive 21. As such, the reducing temperature depends upon the flow additive 21 used. In an example, the reducing temperature ranges from about 250° C. to about 600° C. In another example, the reducing temperature ranges from about 300° C. to about 550° C.

Heating to pyrolyze is accomplished at a thermal decomposition temperature that is sufficient to thermally decompose the flow additive 21. As such, the temperature for pyrolysis depends upon the flow additive 21 used. In an example, the thermal decomposition temperature ranges from about 250° C. to about 600° C. In another example, the pyrolysis temperature ranges from about 300° C. to about 550° C. The flow additive 21 may have a clean thermal decomposition mechanism (e.g., leaves non-volatile residue in an amount <5 wt % of the initial binder, and in some instances non-volatile residue in an amount <<1 wt % of the initial binder). Since the amount of flow additive 21 in the build material composition 12 is low, any carbon residue that is formed and remains in the part is in a very small amount that does not deleteriously affect the part.

Heating to de-bind is accomplished at a thermal decomposition temperature that is sufficient to thermally decompose the binder. As such, the temperature for de-binding depends upon the binder in the agent 14. In an example, the thermal decomposition temperature ranges from about 250° C. to about 600° C. In another example, the thermal decomposition temperature ranges from about 300° C. to about 550° C. The binder may have a clean thermal decomposition mechanism (e.g., leaves non-volatile residue in an amount <5 wt % of the initial binder, and in some instances non-volatile residue in an amount <<1 wt % of the initial binder). The smaller residue percentage (e.g., close to 0%) is more desirable.

While not being bound to any theory, it is believed that the binder-free intermediate structure 31' may maintain its shape due, for example, to one or more of: i) the low amount of stress experience by the part 31' due to it not being physically handled, and/or ii) low level necking occurring between the host metal particles 15 at the decomposition/reducing temperature or the pyrolysis temperature and at the thermal decomposition temperature of the binder. The at least substantially flow additive and binder-free intermediate structure 31' may maintain its shape although the binder is at least substantially removed and the host metal particles 15 are not yet sintered.

The temperature may be raised to sinter the binder-free intermediate structure 31', which can result in the formation of weak bonds that are strengthened throughout sintering. During sintering, the host metal particles 15 coalesce to form the 3D object 35, and so that a desired density of the 3D object 35 is achieved. The sintering temperature is a temperature that is sufficient to sinter the remaining host metal particles 15. The sintering temperature is highly depending upon the composition of the host metal particles 15. During sintering, the at least substantially flow additive and binder-free intermediate structure 31' may be heated to a temperature ranging from about 80% to about 99.9% of the melting point of the host metal particles 15. In another example, the at least substantially flow additive and binder-free intermediate structure 31' may be heated to a temperature ranging from about 90% to about 95% of the melting point of the host metal particles 15. In still another example, the at least substantially flow additive and binder-free intermediate structure 31' may be heated to a temperature ranging from about 60% to about 90% of the melting point of the host metal particles 15. In still another example, the sintering temperature may range from about 50° C. below the melting temperature of host metal particles 15 to about 200° C. below the melting temperature of the host metal particles 15. The sintering temperature may also depend upon the particle size and time for sintering (i.e., high temperature exposure time). As an example, the sintering temperature may range from about 500° C. to about 1800° C. In another example, the sintering temperature is at least 900° C. An example of a sintering temperature for bronze is about 850° C., and an example of a sintering temperature for stainless steel is between about 1300° C. and about 1400° C. While these temperatures are provided as sintering temperature examples, it is to be understood that the sintering temperature depends upon the host metal particles 15 that are utilized, and may be higher or lower than the provided examples. Heating at a suitable sintering temperature sinters and coalesces the host metal particles 15 to form a completed 3D object 35. As a result of final sintering, the density may go from 50% density to over 90%, and in some cases very close to 100% of the theoretical density.

The length of time at which the heat (for each of decomposition/reduction or pyrolysis, de-binding, and sintering) is applied and the rate at which the structure 31, 31' is heated may be dependent, for example, on one or more of: characteristics of the heating mechanism, characteristics of the flow additive 21 and binder, characteristics of the host metal particles 15 (e.g., metal type, particle size, etc.), and/or the characteristics of the 3D object/part 46 (e.g., wall thickness).

Heating, respectively, at the decomposition/reduction or pyrolysis temperature and de-binding temperature may occur for a time period ranging from about 10 minutes to about 72 hours. When the structure 31 contains open porosity to vent out binder and/or flow aid 21 pyrolysis, and/or the amount of the binder and/or flow aid 21 is low, and/or the wall thickness of the structure 31 is relatively thin, the time period for de-binding and decomposition/reduction or pyrolysis may be 3 hours (180 minutes) or less. Longer times may be used if the structure 31 has less open porosity, if the structure 31 has thicker walls, and/or if the structure 31 has a higher concentration of binder. In an example, the decomposition/reduction or pyrolysis and de-binding time period is about 60 minutes. In another example, the de-binding time period is about 180 minutes. The intermediate part 31 may be heated to the decomposition/reduction or pyrolysis and/or de-binding temperatures at a heating rate ranging from about 0.5° C./minute to about 20° C./minute. The heating rate (i.e. temperature rise rate) may depend, in part, on one or more of: the amount of the flow additive and/or binder and/or the porosity of the intermediate part 31.

The binder-free intermediate structure 31' may be heated at the sintering temperature for a time period ranging from about 20 minutes to about 15 hours. In an example, the sintering time period is 60 minutes. In another example, the sintering time period is 90 minutes. In still another example, the sintering time period is less than or equal to 3 hours. The at least substantially flow additive and binder-free intermediate structure 31' may be heated to the sintering temperature at a heating rate ranging from about 1° C./minute to about 20° C./minute.

While FIGS. 7 and 8 illustrate example 3D printing processes, it is to be understood that the build material composition 12 may be used in other additive manufacturing processes. An example of another additive manufacturing process is direct metal laser sintering (DMLS). During DMLS, an energy beam is aimed at a selected region (in some instances less than the entire layer) of a layer of the build material composition 12. The energy beam may first applied to cause the flow additive 21 in the build material composition 12 to decompose, and then the intensity may be increased to raise the temperature so that the remaining host metal particles 15, which are exposed to the energy beam, sinter to form the layer of the 3D part. The application of additional build material composition 12 layers and the selective energy beam exposure may be repeated to build up the 3D part layer by layer. In examples that use DMLS, a binder agent 14 may be omitted from the process.

To further illustrate the present disclosure, examples are given herein. It is to be understood that these examples are provided for illustrative purposes and is not to be construed as limiting the scope of the present disclosure.

EXAMPLES

Example 1

Two examples of the build material composition were prepared according to examples of the methods disclosed herein. Two comparative build material compositions were also prepared according to comparative methods. The host metal used in each of the build material compositions was stainless steel, 316L, grade −22 μm (80%) powder from "Sandvik", (average particle diameter was about 11 μm).

Figure 14:
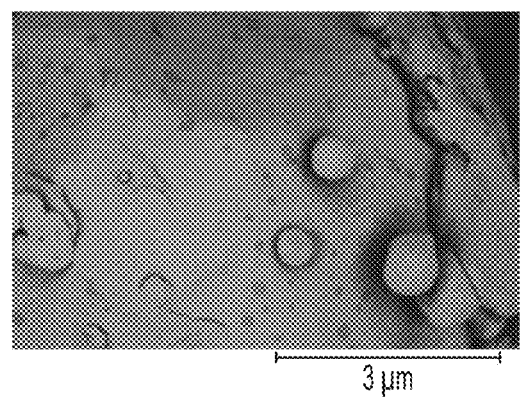
FIGS. 14 through 16 are backscatter SEM images of a host metal (14), the host metal with 0.1 wt % of an example crosslinked organic particle flow additive (15), and the host metal with 0.1 wt % of an example organic material flow additive (16).

The first comparative build material composition was a baseline build material composition, which included the stainless steel host particles without any flow additive. FIG. 14 shows a SEM image, at 65,000× magnification of one of the stain steel host particles without any flow additive thereon.

Ferric oxide ($Fe_2O_3$) flow additives prepared according to different methods were used as the flow additive in the second comparative build material composition and the first example build material composition. Ferric oxide nanoparticles having an average flow additive particle size of about 20 nm from Inframat Corporation were used.

To prepare the second comparative build material composition, some of the ferric oxide nanoparticles were dispersed in water at a concentration of about 5 wt %. The bulk dispersion was dried in a vacuum oven at about 30° C. to about 35° C. (i.e., the liquid water was removed via evaporation). Compacted sediment with a density of about 2 g/cm³ to about 2.5 g/cm³ was produced (density was from about 40% to about 60% of the material bulk density). The compacted sediment was mixed with the stainless steel host particles via rolling the powder mix in a plastic container for about 2 hours. The second comparative build material composition included 0.1 wt % of the comparative example ferric oxide flow additive.

Figure 11A:
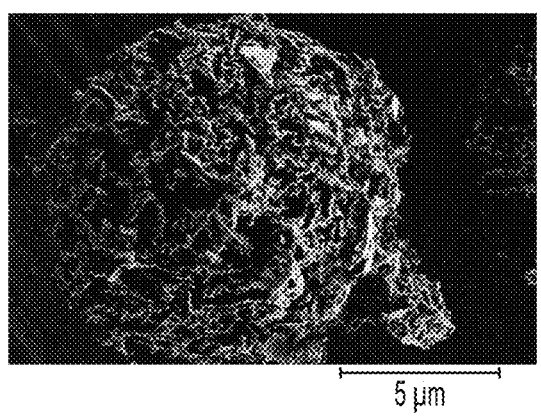
FIGS. 11A and 11B are scanning electron microscope ("SEM") images, at 25,000× magnification (11A) and 150,000× magnification (11B), of an example metal oxide flow additive agglomerate.
Figure 11B:
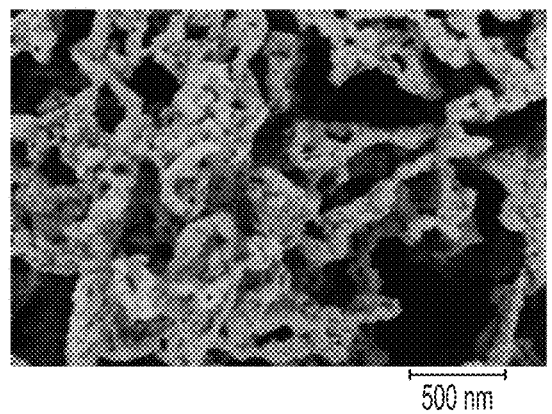

To prepare the first example build material composition, some other of the ferric oxide nanoparticles were dispersed in water at a concentration of about 5 wt %. Droplets of the dispersion were rapidly frozen at a temperature at or below −17° C., and the frozen dispersion was lyophilized (i.e., the frozen water was removed via sublimation) in a vacuum chamber at a temperature down to −45° C. Flow additive agglomerates, having a mesoporous, fractal structure and an average flow additive agglomerate particle size ranging from about 1 μm to a few hundred microns, were produced. FIGS. 11A and 11B show SEM images, at 25,000× magnification (11A) and 150,000× magnification (11B), of the mesoporous, fractal structure of one of the ferric oxide flow additive agglomerates. The freeze-dried ferric oxide flow additive agglomerates had a density ranging from about 0.026 g/cm³ (0.5% of the material bulk density of 5.2 g/cm³) to about 0.156 g/cm³ (3% of the material bulk density of 5.2 g/cm³).

The ferric oxide flow additive agglomerates were mixed with the stainless steel host particles via rolling the powder mix in a plastic container for about 2 hours. Mixing broke the ferric oxide flow additive agglomerates into individual nanoparticles and agglomerate fragments, and disposed the individual nanoparticles and agglomerate fragments on the stainless steel host metal particles. The first example build material composition included 0.1 wt % of the example ferric oxide flow additive.

The second example build material composition was prepared with an example magnetite ($Fe_3O_4$) flow additive. Magnetite nanoparticles (having an average flow additive particle size of about 20 nm from Nanum Nanotecnologia) were dispersed in water at a concentration of about 5 wt %. Droplets of the dispersion were rapidly frozen at a temperature at or below −17° C., and the frozen dispersion was lyophilized (i.e., the frozen water was removed via sublimation) in a vacuum chamber at a temperature down to −45° C. $Fe_3O_4$ flow additive agglomerates, having a mesoporous, fractal structure and an average flow additive agglomerate particle size ranging from about 1 μm to a few hundred microns, were produced. The freeze-dried $Fe_3O_4$ flow additive agglomerates had a density ranging from about 0.5% of the material bulk density to about 3% of the material bulk density.

The $Fe_3O_4$ flow additive agglomerates were mixed with the stainless steel host particles via rolling the powder mix in a plastic container for about 2 hours. Mixing broke the $Fe_3O_4$ flow additive agglomerates into individual nanoparticles and agglomerate fragments, and disposed the individual nanoparticles and agglomerate fragments on the stainless steel host metal particles. The second example build material composition included 0.1 wt % of the example magnetite flow additive.

Figure 10:
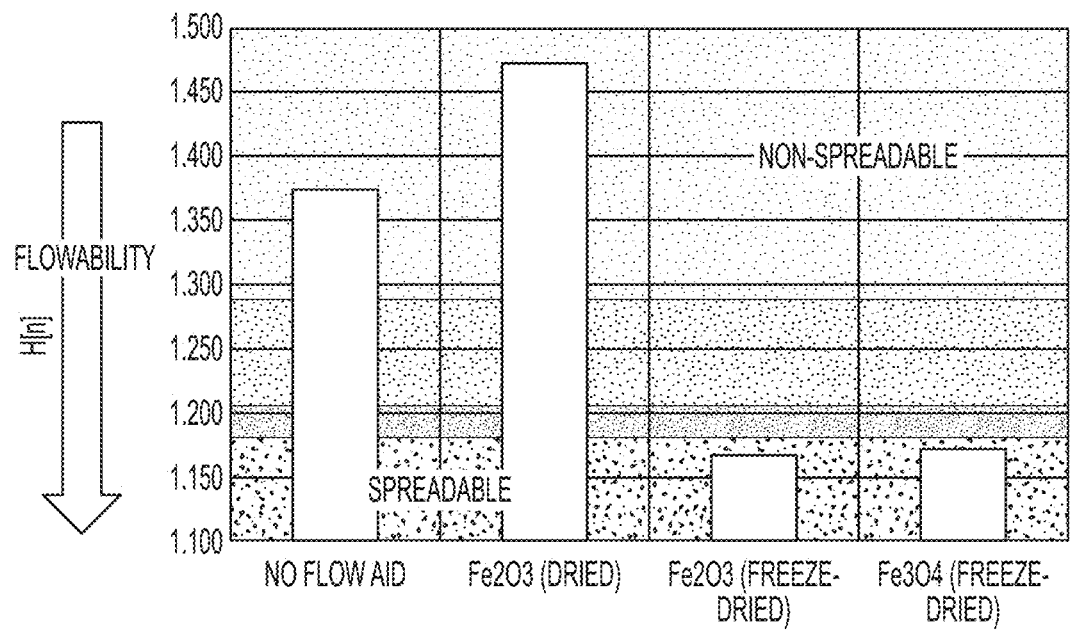
FIG. 10 is a column graph depicting Hausner Ratio test results of comparative example build material compositions and example build material compositions as disclosed herein.

The flowability of each of the build material compositions was evaluated using a Granupack density tester tap (available from Granutools, www.granutools.com). The results of flowability tests are shown in FIG. 10. In FIG. 10, the Hausner Ratio values are shown on the y-axis, and the build material compositions are identified on the x-axis. The first comparative build material composition (labeled "No Flow Aid" in FIG. 10) demonstrated poor flowability, with a Hausner ratio of about 1.37. The second comparative build material composition (labeled "Fe2O3 (Dried)" in FIG. 10) had a Hausner Ratio of about 1.47. The second comparative build material composition had a higher Hausner Ratio than the baseline (first comparative) build material composition, and was considered non-spreadable. The first example build material (labeled "Fe2O3 (Freeze-Dried)" in FIG. 10) had a Hausner Ratio of about 1.16. The first example build material had a lower Hausner Ratio than the baseline (first comparative) build material composition, and was considered spreadable. The second example build material (labeled "Fe2O4 (Freeze-Dried)" in FIG. 10) had a Hausner Ratio of about 1.17. The second example build material had a lower Hausner Ratio than the baseline (first comparative) build material composition, and was considered spreadable.

As shown in FIG. 10, the addition of example iron oxide ($Fe_2O_3$ or $Fe_3O_4$) flow additives that were prepared according to examples of the methods disclosed herein lowered the Hausner Ratio of the example build material compositions compared to the host metal particles without any flow additive (the first comparative build material composition). As also shown in FIG. 10, the addition of example iron oxide ($Fe_2O_3$ or $Fe_3O_4$) flow additives also lowered the Hausner Ratio of the example build material compositions compared to the host metal particles with a comparative iron oxide ($Fe_2O_3$) flow additive that was prepared according to a comparative method (the second comparative build material composition). These results indicate that method of making the build material composition (and in particular the method of making the flow additive) impacts the flowability/speadability of the build material composition.

Example 2

Two additional examples of the build material composition were prepared according to examples of the methods disclosed herein. One additional comparative build material composition was also prepared according to a comparative method. The host metal used in each of the additional build material compositions was stainless steel, 316L, grade −22 μm (80%) powder from "Sandvik", (average particle diameter was about 11 μm).

A crosslinked organic particle flow additive (prepared according to different methods) was used as the flow additive in the third comparative build material composition and the third example build material composition. The crosslinked organic particle flow additive was formed by the copolymerization of an isobornyl methacrylate and ethyleneglycol dimethacrylate monomer mixture. The crosslinked organic particle flow additive had an average flow additive particle size of about 15 nm.

To prepare the third comparative build material composition, some of the crosslinked organic particles were dispersed in water at a concentration of about 10 wt %. The bulk dispersion was dried in a vacuum oven at about 30° C. to about 35° C. (i.e., the liquid water was removed via evaporation). Compacted sediment with a density of about 0.5 g/cm$^3$ was produced (density was from about 50% of the material bulk density). The compacted sediment was mixed with the stainless steel host particles via rolling the powder mix in a plastic container for about 2 hours. The third comparative build material composition included 0.1 wt % of the comparative example crosslinked organic particle flow additive.

Figure 13A:
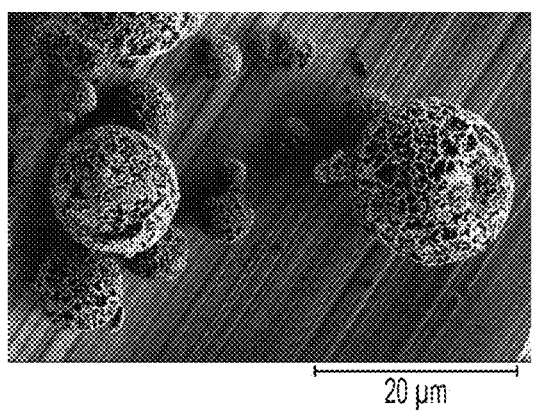
FIGS. 13A and 13B are SEM images, at 8,000× magnification (13A) and 65,000× magnification (13B), of an example crosslinked organic particle flow additive agglomerate.
Figure 13B:
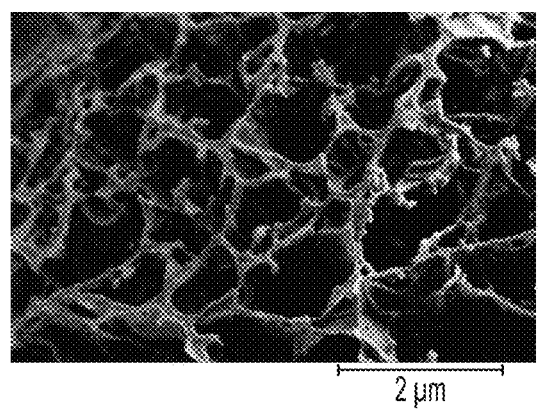

To prepare the third example build material composition, some other of the crosslinked organic particles were dispersed in water at a concentration of about 10 wt %. Droplets of the dispersion were rapidly frozen at a temperature at or below −17° C., and the frozen dispersion was lyophilized (i.e., the frozen water was removed via sublimation) in a vacuum chamber at a temperature down to −45° C. Crosslinked organic particle flow additive agglomerates, having a mesoporous, fractal structure and an average flow additive agglomerate particle size ranging from about 1 μm to about 200 μm, were produced. FIGS. 13A and 13B show SEM images, at 8,000× magnification (13A) and 65,000× magnification (13B), of the mesoporous, fractal structure of some of the crosslinked organic particle flow additive agglomerates. The freeze-dried crosslinked organic particle flow additive agglomerates had a density of about 2% of the material bulk density.

Figure 15:
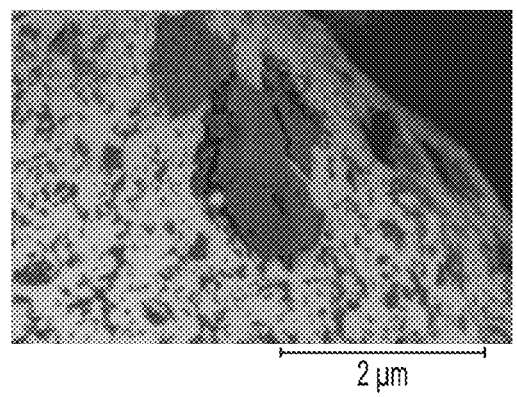

The crosslinked organic particle flow additive agglomerates were mixed with the stainless steel host particles via rolling the powder mix in a plastic container for about 2 hours. Mixing broke the crosslinked organic particle flow additive agglomerates into individual nanoparticles and agglomerate fragments, and disposed the individual nanoparticles and agglomerate fragments on the stainless steel host metal particles. FIG. 15 shows a SEM image, at 75,365× magnification of one of the stain steel host particles with the individual nanoparticles and agglomerate fragments of the crosslinked organic particle flow additive thereon. The third example build material composition included 0.1 wt % of the example crosslinked organic particle flow additive.

The fourth example build material composition was prepared with a high $T_g$ organic particle flow additive. The high $T_g$ organic particle flow additive was formed by the copolymerization of a methyl methacrylate and styrene monomer mixture having a small amount of methacrylic acid. The high $T_g$ organic particle flow additive had a $T_g$ of about 90° C. to about 95° C. and an average flow additive particle size of about 60 nm. To prepare the fourth example build material composition, some of the high $T_g$ organic particles were dispersed in water at a concentration of about 10 wt %. Droplets of the dispersion were rapidly frozen at a temperature at or below −17°, and the frozen dispersion was lyophilized (i.e., the frozen water was removed via sublimation) in a vacuum chamber at a temperature down to −45° C. High $T_g$ organic particle flow additive agglomerates, having a mesoporous, fractal structure and an average flow additive agglomerate particle size ranging from about 1 μm to about 200 μm, were produced. The freeze-dried high $T_g$ organic particle flow additive agglomerates had a density of about 2% of the material bulk density.

Figure 16:
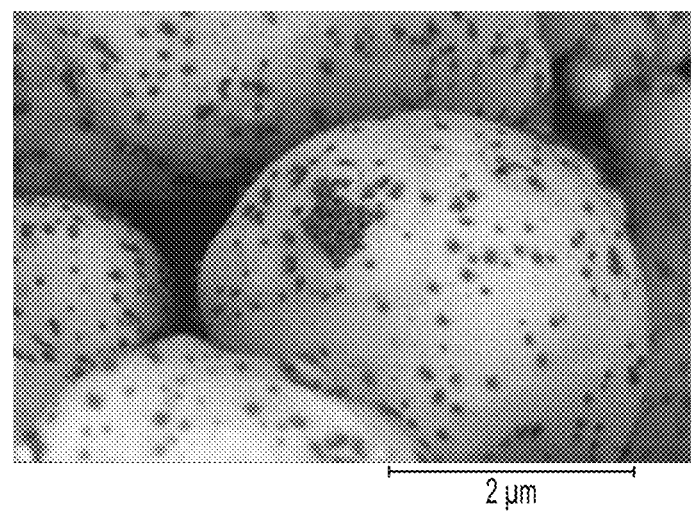

The high $T_g$ organic particle flow additive agglomerates were mixed with the stainless steel host particles via rolling the powder mix in a plastic container for about 2 hours. Mixing broke the high $T_g$ organic particle flow additive agglomerates into individual nanoparticles and agglomerate fragments, and disposed the individual nanoparticles and agglomerate fragments on the stainless steel host metal particles. FIG. 16 shows a SEM image, at 80,000× magnification of some of the stain steel host particles with the individual nanoparticles and agglomerate fragments of the high $T_g$ organic particle flow additive thereon. The fourth example build material composition included 0.1 wt % of the example high $T_g$ organic particle flow additive.

Figure 12:
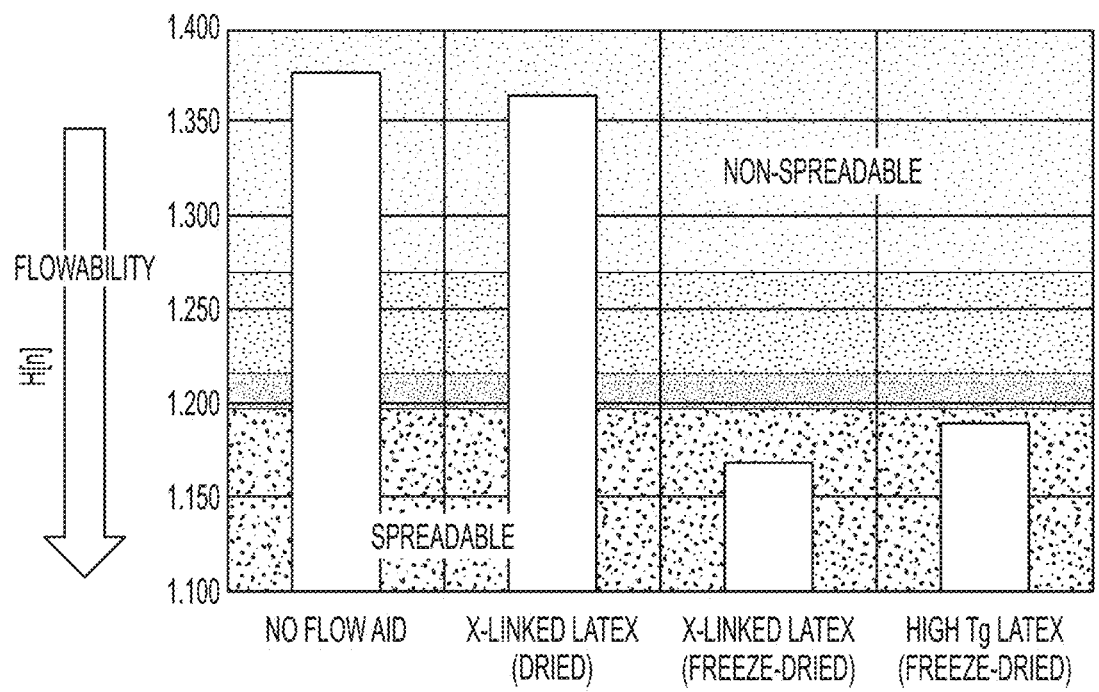
FIG. 12 is a column graph depicting Hausner Ratio test results of other comparative example build material compositions and other example build material compositions as disclosed herein.

The flowability of each of the additional build material compositions was evaluated using a Granupack density tester tap. The results of flowability tests are shown in FIG. 12. In FIG. 12, the Hausner Ratio values are shown on the y-axis, and the build material compositions are identified on the x-axis. The baseline build material composition (the first comparative build material composition form Example 1, labeled "No Flow Aid" in FIG. 12) demonstrated poor flowability, with a Hausner ratio of about 1.37. The third comparative build material composition (labeled "X-linked Latex (Dried)" in FIG. 12) had a Hausner Ratio of about 1.36. The third comparative build material composition had a Hausner Ratio comparable to the baseline (first comparative) build material composition, and was considered non-spreadable. The third example build material (labeled "X-linked Latex (Freeze-Dried)" in FIG. 12) had a Hausner Ratio of about 1.17. The third example build material had a lower Hausner Ratio than the baseline (first comparative) build material composition, and was considered spreadable. The fourth example build material (labeled "High $T_g$ Latex (Freeze-Dried)" in FIG. 12) had a Hausner Ratio of about 1.18. The fourth example build material had a lower Hausner Ratio than the baseline (first comparative) build material composition, and was considered spreadable.

As shown in FIG. 12, the addition of example organic (crosslinked or high $T_g$) flow additives that were prepared according to examples of the methods disclosed herein lowered the Hausner Ratio of the example build material compositions compared to the host metal particles without any flow additive (the first comparative build material composition). As also shown in FIG. 12, the addition of example organic (crosslinked or high $T_g$) flow additives also lowered the Hausner Ratio of the example build material compositions compared to the host metal particles with a comparative organic (crosslinked) flow additive that was prepared according to a comparative method (the third comparative build material composition). These results indicate that method of making the build material composition (and in particular the method of making the flow additive) impacts the flowability/speadability of the build material composition.

It is to be understood that the ranges provided herein include the stated range and any value or sub-range within the stated range, as if the value(s) or sub-range(s) within the stated range were explicitly recited. For example, a range from about 55 wt % to about 95 wt % should be interpreted to include the explicitly recited limits of about 55 wt % to about 95 wt %, as well as individual values, such as 65.73 wt %, 76 wt %, 87.2 wt %, etc., and sub-ranges, such as from about 55.25 wt % to about 90.25 wt %, from about 65 wt % to about 85 wt %, etc. Furthermore, when "about" is utilized to describe a value, this is meant to encompass minor variations (up to +/−10%) from the stated value. As used herein, the term "few" means about three.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing kit, comprising:
    a host metal; and
    flow additive agglomerates to be mixed with the host metal, the flow additive agglomerates having a porous, fractal structure and including flow additive primary particles that:
        have an average flow additive primary particle size ranging from about 1 to about 3 orders of magnitude smaller than an average host metal particle size; and
        are reducible to at least one elemental metal in a reducing environment at a reducing temperature that is less than or equal to a sintering temperature of the host metal, or are pyrolyzable at a pyrolysis temperature that is less than the sintering temperature of the host metal.

2. The 3D printing kit as defined in claim 1, further comprising a binder agent to be applied, via an inkjet printhead, to at least a portion of a layer of a build material composition formed from mixing the flow additive agglomerates with the host metal.

3. The 3D printing kit as defined in claim 1 wherein the flow additive agglomerates have an average flow additive agglomerate particle size ranging from about 100 nm to about 300 μm.

4. The 3D printing kit as defined in claim 1 wherein the flow additive agglomerates have meso-sized pores.

5. The 3D printing kit as defined in claim 1 wherein the flow additive agglomerates have a density ranging from about 0.1% to 20% of a bulk density of a material of the flow additive nanoparticles.

6. The 3D printing kit as defined in claim 1 wherein:
    the host metal has an average particle size of less than 20 μm; and
    the average flow additive primary particle size ranges from about 5 nm to about 200 nm.

7. The 3D printing kit as defined in claim 1 wherein the flow additive primary particles are selected from the group consisting of:
    a metal containing compound that is reducible to at least one elemental metal in a reducing environment at a reducing temperature less than or equal to a sintering temperature of the host metal, wherein the at least one elemental metal is capable of being incorporated into a bulk metal phase of the host metal in a final metal object;
    an organic material that is pyrolyzable at a pyrolysis temperature that is less than the sintering temperature of the host metal; and
    a crosslinked organic particle that is pyrolyzable at a pyrolysis temperature that is less than the sintering temperature of the host metal.

8. The 3D printing kit as defined in claim 1 wherein the flow additive primary particles are selected from the group consisting of i) a metal containing compound selected from the group consisting of vanadium oxide, a chromium oxide, an iron oxide, a cobalt oxide, a nickel oxide, a copper oxide, and a mixed transition metal oxide including any combination of these oxides, ii) a non-crosslinked organic material that is pyrolyzable at a pyrolysis temperature that is less than the sintering temperature of the host metal, and iii) a crosslinked organic particle that is pyrolyzable at a pyrolysis temperature that is less than the sintering temperature of the host metal.

9. The 3D printing kit as defined in claim 1 wherein the flow additive primary particles are selected from the group consisting of vanadium oxide, a chromium oxide, an iron oxide, a cobalt oxide, a nickel oxide, a copper oxide, and a mixed transition metal oxide including any combination of these oxides.

10. The 3D printing kit as defined in claim 1 wherein the flow additive primary particles include a non-crosslinked organic material that is pyrolyzable at a pyrolysis temperature that is less than the sintering temperature of the host metal.

11. The 3D printing kit as defined in claim 10 wherein the non-crosslinked organic material is a heteropolymer including a hydrophobic component that makes up from about 65% to about 99.9% by weight of the heteropolymer, and a hydrophilic component that makes up from about 0.1% to about 35% by weight of the heteropolymer.

12. The 3D printing kit as defined in claim 10 wherein the non-crosslinked organic material is produced by emulsion polymerization or co-polymerization.

13. The 3D printing kit as defined in claim 1 wherein the flow additive primary particles are crosslinked organic particles that are pyrolyzable at a pyrolysis temperature that is less than the sintering temperature of the host metal.

14. The 3D printing kit as defined in claim 13 wherein the crosslinked organic particles have crosslinked polymer chains, a glass transition temperature ($T_g$) of at least 90° C., and a primary particle size of 50 nm or less.

15. The 3D printing kit as defined in claim 13 wherein the crosslinked organic particles are produced by emulsion polymerization or co-polymerization.

* * * * *